US010308756B2

(12) United States Patent
Kawato

(10) Patent No.: US 10,308,756 B2
(45) Date of Patent: Jun. 4, 2019

(54) POLYMERIZABLE COMPOSITION FOR OPTICAL MATERIAL AND USE THEREOF

(71) Applicant: MITSUI CHEMICALS, INC., Minato-ku, Tokyao (JP)

(72) Inventor: Nobuo Kawato, Kurume (JP)

(73) Assignee: MITSUI CHEMICALS, INC., Minato-Ku, Tokyo (JP)

( * ) Notice: Subject to any disclaimer, the term of this patent is extended or adjusted under 35 U.S.C. 154(b) by 234 days.

(21) Appl. No.: 15/318,015

(22) PCT Filed: Jul. 7, 2015

(86) PCT No.: PCT/JP2015/069529
§ 371 (c)(1),
(2) Date: Dec. 12, 2016

(87) PCT Pub. No.: WO2016/006605
PCT Pub. Date: Jan. 14, 2016

(65) Prior Publication Data
US 2017/0129989 A1   May 11, 2017

(30) Foreign Application Priority Data
Jul. 8, 2014   (JP) ................. 2014-140776

(51) Int. Cl.
*G02B 1/04* (2006.01)
*C08G 18/10* (2006.01)
*C08G 18/32* (2006.01)
*C08G 18/38* (2006.01)
*C08G 18/72* (2006.01)
*C08G 18/73* (2006.01)
*C08G 18/75* (2006.01)

(52) U.S. Cl.
CPC ......... *C08G 18/3876* (2013.01); *C08G 18/10* (2013.01); *C08G 18/3228* (2013.01); *C08G 18/3234* (2013.01); *C08G 18/722* (2013.01); *C08G 18/724* (2013.01); *C08G 18/73* (2013.01); *C08G 18/757* (2013.01); *C08G 18/758* (2013.01); *G02B 1/04* (2013.01); *G02B 1/041* (2013.01)

(58) Field of Classification Search
CPC ....... C08G 18/3876; C08G 18/3228; C08G 18/73; C08G 18/757; C08G 18/722; C08G 18/758; C08G 18/3234; C08G 18/724; C08G 18/10; G02B 1/041; G02B 1/04
See application file for complete search history.

(56) References Cited

U.S. PATENT DOCUMENTS

| 3,943,158 | A | * | 3/1976 | Dietrich ............... C07C 275/14 560/330 |
| 5,087,758 | A | | 2/1992 | Kanemura et al. |
| 5,191,055 | A | | 3/1993 | Kanemura et al. |
| 5,962,617 | A | | 10/1999 | Slagel |
| 6,127,505 | A | | 10/2000 | Slagel |
| 7,087,698 | B1 | | 8/2006 | Okoroafor et al. |
| 7,098,290 | B1 | | 8/2006 | Okoroafor et al. |
| 8,178,644 | B2 | | 5/2012 | Derderian et al. |
| 2003/0158369 | A1 | | 8/2003 | Slagel |
| 2004/0138401 | A1 | | 7/2004 | Bojkova et al. |
| 2004/0143090 | A1 | | 7/2004 | Bojkova et al. |
| 2007/0100112 | A1 | | 5/2007 | Sarpeshkar et al. |
| 2009/0171059 | A1 | | 7/2009 | Gerkin et al. |
| 2009/0171060 | A1 | | 7/2009 | Gerkin et al. |
| 2014/0039145 | A1 | | 2/2014 | Jang et al. |
| 2015/0104652 | A1 | | 4/2015 | Kugel et al. |

FOREIGN PATENT DOCUMENTS

| EP | 2682430 A2 | 1/2014 |
| JP | 3-199226 A | 8/1991 |
| JP | 9-110956 A | 4/1997 |
| JP | 2008-540817 A | 11/2008 |
| JP | 2009-513782 A | 4/2009 |
| JP | 2012-131871 A | 7/2012 |
| JP | 2013-076076 A | 4/2013 |
| JP | 2014-508207 A | 4/2014 |
| KR | 20120100825 A | 9/2012 |
| WO | WO 96/23827 A1 | 8/1996 |
| WO | WO 01/36507 A1 | 5/2001 |
| WO | WO 01/36508 A1 | 5/2001 |
| WO | WO 2006/130339 A1 | 12/2006 |
| WO | WO 2007/050542 A1 | 5/2007 |
| WO | WO 2007/097798 A1 | 8/2007 |
| WO | WO 2009/006034 A1 * | 1/2009 |

(Continued)

OTHER PUBLICATIONS

Office Action issued by the Korean Patent Office in corresponding Korean Patent Application No. 10-2016-7032832 dated Oct. 10, 2017 (5 pages).
International Search Report (PCT/ISA/210) dated Oct. 13, 2015, by the Japanese Patent Office as the International Searching Authority for International Application No. PCT/JP2015/069259.
Written Opinion (PCT/ISA/237) dated Oct. 13, 2015, by the Japanese Patent Office as the International Searching Authority for International Application No. PCT/JP2015/069259.
The First Office Action issued by the State Intellectual Property Office of People's Republic of China in corresponding Chinese Patent Application No. 201580036078.1 dated Aug. 17, 2018 (24 pages including partial English translation).

\* cited by examiner

*Primary Examiner* — Rabon A Sergent
(74) *Attorney, Agent, or Firm* — Buchanan, Ingersoll & Rooney PC

(57) ABSTRACT

Provided is a polymerizable composition for an optical material including (A) an amine having two or more secondary amino groups, (B) an isocyanate having two or more isocyanato groups, and (C) a thiol having three or more mercapto groups, in which the ratio (a/b) of the molar number a of amino groups in the amine (A) with respect to the molar number b of isocyanato groups in the isocyanate (B) is in the range of 0.10 to 0.60.

15 Claims, No Drawings

(56) References Cited

FOREIGN PATENT DOCUMENTS

| | | |
|---|---|---|
| WO | WO 2009/088456 A2 | 7/2009 |
| WO | WO 2012/118351 A2 | 9/2012 |
| WO | WO 2013/188176 A1 | 12/2013 |

US 10,308,756 B2

POLYMERIZABLE COMPOSITION FOR OPTICAL MATERIAL AND USE THEREOF

TECHNICAL FIELD

The present invention relates to a polymerizable composition for an optical material with which a thiourethane urea molded product is obtained and a method for producing the same.

BACKGROUND ART

Plastic lenses are lightweight, less fragile, and dyeable, as compared with inorganic lenses. For these reasons, plastic lenses for use in eyeglasses and sunglasses have become widespread. A variety of resins have heretofore been developed and used. Representative examples among them include allyl resins obtained from diethylene glycol bis-allyl carbonates and diallyl isophthalates, and (meth)acrylic resins obtained from (meth)acrylates. Examples of higher refractive index resins include thiourethane resins obtained from isocyanates and thiols (Patent Document 1).

Owing to changes in lifestyle, the population of people enjoying physical activities such as sports while wearing sunglasses has recently been increased. In addition, due to growing safety awareness, children's eyeglasses have been increasingly demanded to be hardly cracked. From these circumstances, there has been an increasing demand for a base material having a lighter weight and a good impact resistance. In response to these growing requirements, a urethane urea molded product as a base material having good impact resistance has been developed for eyeglass lenses (Patent Documents 2 to 6).

RELATED DOCUMENTS

Patent Documents

[Patent Document 1] Japanese Laid-open Patent Publication No. H09-110956
[Patent Document 2] Pamphlet of International Publication No. WO 1996/023827
[Patent Document 3] Pamphlet of International Publication No. WO 2001/036507
[Patent Document 4] Pamphlet of International Publication No. WO 2001/036508
[Patent Document 5] Pamphlet of International Publication No. WO 2007/097798
[Patent Document 6] Pamphlet of International Publication No. WO 2009/088456

SUMMARY OF THE INVENTION

A thiourethane molded product is capable of providing a plastic lens having a high refractive index. However, there is a tendency of an increase in a specific gravity as a refractive index becomes higher, and there may be some cases where the effect of the weight reduction becomes smaller as a molded product has a higher refractive index.

Meanwhile, a urethane urea molded product has a lower specific gravity than a thiourethane molded product, is therefore a lightweight material, and is also capable of providing a plastic lens having a good impact resistance. However, a plastic lens made of a urethane urea molded product exhibits a poor light resistance, and may suffer from yellowing in some cases upon long-term use thereof. Further, since a period of time from the preparation of a composition to the curing thereof (hereinafter, referred to as pot life) is short, there may be cases where polymerization plaques are generated during injection of the composition into a casting mold, and the polymerization rapidly proceeds. As a result, there may be some cases where a lot of striae are generated in the resulting lens.

In view of these problems of the related art, the present inventors have conducted extensive studies to develop a polymerizable composition which is capable of providing a high-refractive index thiourethane urea molded product having a low specific gravity, an excellent impact resistance and an excellent light resistance, and also exhibiting suppressed occurrence of optical distortion (striae) due to a long pot life of the polymerizable composition.

The present inventors have found that it is possible to solve the above-mentioned problems by including specific amines, isocyanates, and thiols and using the amines and the isocyanates in a ratio in a predetermined range. The present invention has been completed based on such a finding. Further, the present inventors have also unexpectedly found that a thiourethane urea molded product with further addition of an amine, that is the molded product consisting of a thiol, an isocyanate and an amine exhibits a higher heat resistance than a thiourethane molded product consisting of a thiol and an isocyanate. An increase in heat resistance of a molded product results in excellent secondary workability in that deformation or uneven dyeing during dyeing is suppressed and also deformation during coating is suppressed. Therefore, a desired product can be produced in a good yield, which can significantly contribute to industry.

The present invention can be described as follows.

[1] A polymerizable composition for an optical material, including:

(A) an amine having two or more secondary amino groups;

(B) an isocyanate having two or more isocyanato groups; and (C) a thiol having three or more mercapto groups, in which the ratio (a/b) of the molar number a of amino groups in the amine (A) with respect to the molar number b of isocyanato groups in the isocyanate (B) is in the range of 0.10 to 0.60.

[2] The polymerizable composition for an optical material according to [1], in which the amine (A) is comprised of one or more compounds selected from a secondary aliphatic amine and a secondary alicyclic amine.

[3] The polymerizable composition for an optical material according to [1] or [2], in which the amine (A) has two or more secondary amino groups represented by the formula: —NHR, and two or more R's may be the same or different from each other and are selected from an isopropyl group, a 1,2,2-trimethylpropyl group, a tert-butyl group, a sec-butyl group, and a 1,3-dimethylbutyl group.

[4] The polymerizable composition for an optical material according to any one of [1] to [3], in which the molecular weight of the amine (A) is 600 or less.

[5] The polymerizable composition for an optical material according to anyone of [1] to [4], in which the amine (A) is comprised of one or more compounds selected from
N,N'-di-tert-butyl-ethylenediamine,
N,N'-di(1,2,2-trimethylpropyl)-1,6-hexamethylenediamine,
N,N'-di-isopropyl-m-xylylenediamine,
N,N'-di-sec-butyl-m-xylylenediamine,
N,N'-(cyclohexyl-1,3-diylbis(methylene))bis(isopropyl-2-amine),
N,N'-(cyclohexyl-1,3-diylbis(methylene))bis(sec-propyl-2-amine), N,N'-(cyclohexyl-1,4-diylbis(methylene))bis(isopropyl-2-amine),
N,N'-(cyclohexyl-1,4-diylbis(methylene))bis(sec-propyl-2-amine),
N,N'-di-isopropyl-isophorone diamine,
N,N'-di-sec-butyl-4,4'-methylene-bis(cyclohexylamine),
N,N'-di-sec-butyl-4,4'-methylene-bis(2-methylcyclohexylamine),
N,N'-di-isopropyl-2,5-diaminomethyl-bicyclo[2.2.1]heptane,
N,N'-di-sec-butyl-2,5-diaminomethyl-bicyclo[2.2.1]heptane,
N,N'-di-isopropyl-2,6-diaminomethyl-bicyclo[2.2.1]heptane, and
N,N'-di-sec-butyl-2,6-diaminomethyl-bicyclo[2.2.1]heptane.

[6] The polymerizable composition for an optical material according to any one of [1] to [5], in which the isocyanate (B) is comprised of one or more compounds selected from m-xylylene diisocyanate, 2,5-bis(isocyanatomethyl)bicyclo[2.2.1]heptane, 2,6-bis(isocyanatomethyl)bicyclo[2.2.1]heptane, 1,3-bis(isocyanatomethyl)cyclohexane, 1,4-bis(isocyanatomethyl)cyclohexane, isophorone diisocyanate, 4,4'-methylene-bis(cyclohexyl isocyanate), 1,5-pentane diisocyanate, 1,6-hexamethylene diisocyanate, 2,4-tolylene diisocyanate, and 2,6-tolylene diisocyanate.

[7] The polymerizable composition for an optical material according to anyone of [1] to [6], in which the thiol (C) is comprised of one or more compounds selected from 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 4-mercaptomethyl-1,8-dimercapto-3,6-dithiaoctane, 1,1,3,3-tetrakis(mercaptomethylthio)propane, trimethylolpropane tris(3-mercaptopropionate), pentaerythritol tetrakis(2-mercaptoacetate), and pentaerythritol tetrakis(3-mercaptopropionate).

[8] The polymerizable composition for an optical material according to any one of [1] to [7], further including a prepolymer obtained by reacting the amine (A) and the isocyanate (B), and the thiol (C).

[9] A molded product obtained by polymerizing the polymerizable composition for an optical material according to any one of [1] to [8].

[10] An optical material comprised of the molded product according to [9].

[11] A plastic lens comprised of the molded product according to [9].

[12] A method for producing a polymerizable composition for an optical material, including:
a step (i) of reacting an amine (A) and an isocyanate (B) to obtain a prepolymer; and
a step (ii) of adding and mixing a thiol (C) into the prepolymer,
in which the ratio (a/b) of the molar number a of amino groups in the amine (A) with respect to the molar number b of isocyanato groups in the isocyanate (B) is in the range of 0.10 to 0.60.

[13] The method for producing a polymerizable composition for an optical material according to [12], in which the amine (A) is one or more compounds selected from a secondary aliphatic amine and a secondary alicyclic amine.

[14] The method for producing a polymerizable composition for an optical material according to [12] or [13], in which the amine (A) is comprised of a compound having two or more secondary amino groups represented by the formula: —NHR, and two or more R's may be the same or different from each other and are selected from an isopropyl group, a 1,2,2-trimethylpropyl group, a tert-butyl group, a sec-butyl group, and a 1,3-dimethylbutyl group.

[15] The method for producing a polymerizable composition for an optical material according to any one of [12] to [14], in which the molecular weight of the amine (A) is 600 or less.

[16] The method for producing a polymerizable composition for an optical material according to any one of [12] to [15], in which the amine (A) is comprised of one or more compounds selected from
N,N'-di-tert-butyl-ethylenediamine,
N,N'-di(1,2,2-trimethylpropyl)-1,6-hexamethylenediamine,
N,N'-di-isopropyl-m-xylylenediamine,
N,N'-di-sec-butyl-m-xylylenediamine,
N,N'-(cyclohexyl-1,3-diylbis(methylene))bis(isopropyl-2-amine),
N,N'-(cyclohexyl-1,3-diylbis(methylene))bis(sec-propyl-2-amine),
N,N'-(cyclohexyl-1,4-diylbis(methylene))bis(isopropyl-2-amine),
N,N'-(cyclohexyl-1,4-diylbis(methylene))bis(sec-propyl-2-amine),
N,N'-di-isopropyl-isophorone diamine,
N,N'-di-sec-butyl-4,4'-methylene-bis(cyclohexylamine),
N,N'-di-sec-butyl-4,4'-methylene-bis(2-methylcyclohexylamine),
N,N'-di-isopropyl-2,5-diaminomethyl-bicyclo[2.2.1]heptane,
N,N'-di-sec-butyl-2,5-diaminomethyl-bicyclo[2.2.1]heptane,
N,N'-di-isopropyl-2,6-diaminomethyl-bicyclo[2.2.1]heptane, and
N,N'-di-sec-butyl-2,6-diaminomethyl-bicyclo[2.2.1]heptane.

According to the polymerizable composition for an optical material of the present invention, it is possible to obtain a high-refractive index thiourethane urea molded product having a low specific gravity, an excellent heat resistance, an excellent impact resistance, and an excellent light resistance, and also exhibiting suppressed occurrence of optical distortion (striae) due to a long pot life of the polymerizable composition. Such a thiourethane urea molded product can be suitably used in a variety of optical materials where high transparency is required, in particular, eyeglass lenses.

DESCRIPTION OF EMBODIMENTS

Hereinafter, the polymerizable composition for an optical material according to the present invention will be described with reference to specific examples.

The polymerizable composition for an optical material according to the present invention contains (A) an amine having two or more secondary amino groups (hereinafter, simply referred to as amine (A)), (B) an isocyanate having two or more isocyanato groups (hereinafter, simply referred to as isocyanate (B)), and (C) a thiol having three or more mercapto groups (hereinafter, simply referred to as thiol (C)).

[Amine (A)]

The amine (A) is an amine having two or more secondary amino groups.

The amine (A) may be comprised of one or more compounds selected from a secondary aliphatic amine and a secondary alicyclic amine.

Examples of the secondary aliphatic amine include N,N'-dimethylethylenediamine, N,N'-di-isopropyl-ethylenediamine, N,N'-di-sec-butyl-ethylenediamine, N,N'-di-tert-butyl-ethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-di-isopropyl-1,6-diaminohexane, N,N'-di-sec-butyl-1,6-diaminohexane, N,N'-di(1,2,2-trimethylpropyl)-1,6-diaminohexane, N,N'-dimethyl-1,7-diaminoheptane, N,N'-di-isopropyl-m-xylylenediamine, and N,N'-di-sec-butyl-m-xylylenediamine. The secondary aliphatic amine may be comprised of at least one selected from these compounds.

Examples of the secondary alicyclic amine include N,N'-(cyclohexyl-1,3-diylbis(methylene))bis(isopropyl-2-amine), N,N'-(cyclohexyl-1,3-diylbis(methylene))bis(sec-propyl-2-amine), N,N'-(cyclohexyl-1,4-diylbis(methylene))bis(isopropyl-2-amine), N,N'-(cyclohexyl-1,4-diylbis(methylene))bis(sec-propyl-2-amine), N,N'-di-isopropyl-isophorone diamine, N,N'-di-sec-butyl-isophorone diamine, piperazine, 2-methylpiperazine, 2,5-dimethylpiperazine, 2,6-dimethylpiperazine, N,N'-di-isopropyl-4,4'-methylene-bis(cyclohexylamine), N,N'-di-sec-butyl-4,4'-methylene-bis(cyclohexylamine), N,N'-di-isopropyl-4,4'-methylene-bis(2-methylcyclohexylamine), N,N'-di-sec-butyl-4,4'-methylene-bis(2-methylcyclohexylamine), N,N'-di-isopropyl-2,5-diaminomethyl-bicyclo[2.2.1]heptane, N,N'-di-sec-butyl-2,5-diaminomethyl-bicyclo[2.2.1]heptane, N,N'-di-isopropyl-2,6-diaminomethyl-bicyclo[2.2.1]heptane, and N,N'-di-sec-butyl-2,6-diaminomethyl-bicyclo[2.2.1]heptane, and the like. The secondary alicyclic amine may be comprised of at least one selected from these compounds.

The amine (A) may be comprised of a compound having two or more secondary amino groups represented by the formula: —NHR. In the formula, two or more R's may be the same or different from each other and may be selected from an isopropyl group, a 1,2,2-trimethylpropyl group, a tert-butyl group, a sec-butyl group, and a 1,3-dimethylbutyl group.

An amine having a molecular weight of 600 or less, preferably 400 or less may be used as the amine (A). Thus, a pot life is excellent, whereby it is possible to ensure handling properties until a period of time from the preparation of a polymerizable composition for an optical material to the casting thereof into a mold.

Such an amine (A) is preferably at least one selected from
N,N'-di-tert-butyl-ethylenediamine,
N,N'-di(1,2,2-trimethylpropyl)-1,6-hexamethylenediamine,
N,N'-di-isopropyl-m-xylylenediamine,
N,N'-di-sec-butyl-m-xylylenediamine,
N,N'-(cyclohexyl-1,3-diylbis(methylene))bis(isopropyl-2-amine),
N,N'-(cyclohexyl-1,3-diylbis(methylene))bis(sec-propyl-2-amine),
N,N'-(cyclohexyl-1,4-diylbis(methylene))bis(isopropyl-2-amine),
N,N'-(cyclohexyl-1,4-diylbis(methylene))bis(sec-propyl-2-amine),
N,N'-di-isopropyl-isophorone diamine,
N,N'-di-sec-butyl-4,4'-methylene-bis(cyclohexylamine),
N,N'-di-sec-butyl-4,4'-methylene-bis(2-methylcyclohexylamine),
N,N'-di-isopropyl-2,5-diaminomethyl-bicyclo[2.2.1]heptane,
N,N'-di-sec-butyl-2,5-diaminomethyl-bicyclo[2.2.1]heptane,
N,N'-di-isopropyl-2,6-diaminomethyl-bicyclo[2.2.1]heptane, and
N,N'-di-sec-butyl-2,6-diaminomethyl-bicyclo[2.2.1]heptane, more preferably at least one selected from
N,N'-di-tert-butyl-ethylenediamine,
N,N'-di(1,2,2-trimethylpropyl)-1,6-hexamethylenediamine,
N,N'-di-sec-butyl-4,4'-methylene-bis(cyclohexylamine), and
N,N'-di-isopropyl-isophorone diamine, and particularly preferably at least one selected from
N,N'-di-tert-butyl-ethylenediamine,
N,N'-di(1,2,2-trimethylpropyl)-1,6-hexamethylenediamine, and
N,N'-di-sec-butyl-4,4'-methylene-bis(cyclohexylamine).

[Isocyanate (B)]

The isocyanate (B) is an isocyanate having two or more isocyanato groups, and examples thereof include an aliphatic isocyanate, an alicyclic isocyanate, an aromatic isocyanate, a heterocyclic isocyanate, and a combination thereof.

Examples of the aliphatic isocyanate include 2,2,4-trimethylhexane diisocyanate, 2,4,4-trimethylhexane diisocyanate, lysine diisocyanatomethyl ester, m-xylylene diisocyanate, α,α,α',α'-tetramethylxylylene diisocyanate, bis(isocyanatomethyl)naphthalene, mesitylylene triisocyanate, bis(isocyanatomethyl)sulfide, bis(isocyanatoethyl)sulfide, bis(isocyanatomethyl)disulfide, bis(isocyanatoethyl)disulfide, bis(isocyanatomethylthio)methane, bis(isocyanatoethylthio)methane, bis(isocyanatomethylthio)ethane, bis(isocyanatoethylthio)ethane, 1,5-pentane diisocyanate, an isocyanurate-modified product of 1,5-pentane diisocyanate, an allophanate-modified product of 1,5-pentane diisocyanate, 1,6-hexamethylene diisocyanate, an isocyanurate-modified product of 1,6-hexamethylene diisocyanate, and an allophanate-modified product of 1,6-hexamethylene diisocyanate, and the like. The aliphatic isocyanate may be comprised of at least one selected from these compounds.

Examples of the alicyclic isocyanate include isophorone diisocyanate, 1,3-bis(isocyanatomethyl)cyclohexane, 1,4-bis(isocyanatomethyl)cyclohexane, 4,4'-methylene-bis(cyclohexyl isocyanate), methylcyclohexane diisocyanate, 2,5-bis(isocyanatomethyl)bicyclo[2.2.1]heptane, 2,6-bis(isocyanatomethyl)bicyclo[2.2.1]heptane, 3,8-bis(isocyanatomethyl)tricyclodecane, 3,9-bis(isocyanatomethyl)tricyclodecane, 4,8-bis(isocyanatomethyl)tricyclodecane, and 4,9-bis(isocyanatomethyl)tricyclodecane, and the like. The alicyclic isocyanate may be comprised of at least one selected from these compounds.

Examples of the aromatic isocyanate include naphthalenediisocyanate, m-phenylenediisocyanate, p-phenylenediisocyanate, 2,4-tolylene diisocyanate, 2,6-tolylene diisocyanate, biphenyl diisocyanate, benzenetriisocyanate, 4,4'-diphenylmethane diisocyanate, 2,4'-diphenylmethane diisocyanate, and 2,2'-diphenylmethane diisocyanate, and the like. The aromatic isocyanate may be comprised of at least one selected from these compounds.

Examples of the heterocyclic isocyanate include 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl)tetrahydrothiophene, 2,5-diisocyanato-1,4-dithiane, 2,5-bis(isocyanatomethyl)-1,4-dithiane, 4,5-diisocyanato-1,3-dithiolane, and 4,5-bis(isocyanatomethyl)-1,3-dithiolane, and the like. The heterocyclic isocyanate may be comprised of at least one selected from these compounds.

Among these exemplified compounds, preferred is at least one selected from m-xylylene diisocyanate, 2,5-bis(isocyanatomethyl)bicyclo[2.2.1]heptane, 2,6-bis(isocyanatomethyl)bicyclo[2.2.1]heptane, 1,3-bis(isocyanatomethyl)cyclohexane, 1,4-bis(isocyanatomethyl)cyclohexane, isophorone diisocyanate, 4,4'-methylene-bis(cyclohexyl isocyanate), 1,5-pentane diisocyanate, an isocyanurate-modified product of 1,5-pentane diisocyanate, an allophanate-modified product of 1,5-pentane diisocyanate, 1,6-hexamethylene diisocyanate, an isocyanurate-modified product of 1,6-hexamethylene diisocyanate, an allophanate-modified product of 1,6-hexamethylene diisocyanate, 2,4-tolylene diisocyanate, and 2,6-tolylene diisocyanate, more preferred is at least one selected from m-xylylene diisocyanate, 2,5-bis(isocyanatomethyl)bicyclo[2.2.1]heptane, 2,6-bis(isocyanatomethyl)bicyclo[2.2.1]heptane, 1,3-bis(isocyanatomethyl)cyclohexane, 1,4-bis(isocyanatomethyl)cyclohexane, isophorone diisocyanate, 4,4'-methylene-bis(cyclohexyl isocyanate), 1,5-pentane diisocyanate, 1,6-hexamethylene diisocyanate, 2,4-tolylene diisocyanate, and 2,6-tolylene diisocyanate, particularly preferred is at least one selected from m-xylylene diisocyanate, 2,5-bis(isocyanatomethyl)bicyclo[2.2.1]heptane, 2,6-bis(isocyanatomethyl)bicyclo[2.2.1]heptane, 1,3-bis(isocyanatomethyl)cyclohexane, 1,4-bis(isocyanatomethyl)cyclohexane, 4,4'-methylene-bis(cyclohexyl isocyanate), and 1,6-hexamethylene diisocyanate, and most preferred is at least one selected from m-xylylene diisocyanate, 2,5-bis(isocyanatomethyl)bicyclo[2.2.1]heptane, 2,6-bis(isocyanatomethyl)bicyclo[2.2.1]heptane, 1,3-bis(isocyanatomethyl)cyclohexane, 1,4-bis(isocyanatomethyl)cyclohexane, and 4,4'-methylene-bis(cyclohexyl isocyanate).

[Thiol (C)]

The thiol (C) is a thiol having three or more mercapto groups, and examples thereof include an aliphatic thiol, an aromatic thiol, and a combination thereof.

Examples of the aliphatic thiol include tetrakis(mercaptomethyl)methane, 1,2,3-tris(mercaptomethylthio)propane, 1,2,3-tris(2-mercaptoethylthio)propane, 1,2,3-tris(3-mercaptopropylthio)propane, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 1,1,3,3-tetrakis(mercaptomethylthio)propane, tetrakis(mercaptomethylthiomethyl)methane, tetrakis(2-mercaptoethylthiomethyl)methane, 2,3-dimercapto-1-propanol(3-mercaptopropionate), 3-mercapto-1,2-propanediolbis(2-mercaptoacetate), 3-mercapto-1,2-propanedioldi(3-mercaptopropionate), trimethylol propane tris(2-mercaptoacetate), trimethylolpropane tris(3-mercaptopropionate), trimethylolethanetris(2-mercaptoacetate), trimethylolethanetris(3-mercaptopropionate), pentaerythritol tetrakis(2-mercaptoacetate), pentaerythritol tetrakis(3-mercaptopropionate), glycerol tris(2-mercaptoacetate), and glycerol tris(3-mercaptopropionate), and the like. The aliphatic thiol may be comprised of at least one selected from these compounds.

Examples of the aromatic thiol include 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,3,5-tris(mercaptoethyl)benzene, and 1,2,4-tris(mercaptoethyl)benzene, and the like. The aromatic thiol may be comprised of at least one selected from these compounds.

Among these exemplified compounds, preferred is at least one selected from 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 4-mercaptomethyl-1,8-dimercapto-3,6-dithiaoctane, 1,1,3,3-tetrakis(mercaptomethylthio)propane, trimethylolpropane tris(3-mercaptopropionate), pentaerythritol tetrakis(2-mercaptoacetate), and pentaerythritol tetrakis(3-mercaptopropionate), and more preferred is at least one selected from 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 4-mercaptomethyl-1,8-dimercapto-3,6-dithiaoctane, and pentaerythritol tetrakis(3-mercaptopropionate).

[Other Components]

Depending on the purpose, the polymerizable composition for an optical material according to the present invention may contain additives such as a polymerization catalyst, an internal mold release agent, an ultraviolet absorber, a light stabilizer, an antioxidant, an anti-coloring agent, a dye, and a resin modifier.

Examples of the polymerization catalyst that can be used include a Lewis acid, an amine, an organic acid, and an amine organic acid salt. Preferred are a Lewis acid, an amine, and an amine organic acid salt, and more preferred are dimethyl tin chloride, dibutyl tin chloride, and dibutyl tin laurate, and the like. The amount of the polymerization catalyst to be added is preferably 0.005 parts by weight to 0.5 parts by weight, and more preferably 0.005 parts by weight to 0.3 parts by weight, with respect to 100 parts by weight of the polymerizable composition.

As the internal mold release agent, an acidic phosphoric acid ester may be used. Examples of the acidic phosphoric acid ester include a phosphoric acid monoester and a phosphoric acid diester, which may be used alone or in combination of two or more thereof. Preferred are internal mold release agents for MR manufactured by Mitsui Chemicals, Inc., Zelec UN manufactured by STEPAN Company, a JP series manufactured by JOHOKU CHEMICAL CO., LTD., a Phosphanol series manufactured by TOHO Chemical Industry Co., Ltd., an AP or DP series manufactured by DAIHACHI CHEMICAL INDUSTRY CO., LTD., and the like, and more preferred are internal mold release agents for MR manufactured by Mitsui Chemicals, Inc., and Zelec UN manufactured by STEPAN Company. The amount of the internal mold release agent to be added is preferably 0.05 parts by weight to 1.0 part by weight, and more preferably 0.06 parts by weight to 0.5 parts by weight, with respect to 100 parts by weight of the polymerizable composition.

The ultraviolet absorber is preferably a benzotriazole compound, a triazine compound, a benzophenone compound, or a benzoate compound, and more preferably a benzotriazole compound. The amount of the ultraviolet absorber to be added is preferably 0.05 parts by weight to 2.5 parts by weight, and more preferably 0.05 parts by weight to 2.0 parts by weight, with respect to 100 parts by weight of the polymerizable composition.

The polymerizable composition for an optical material according to the present invention may contain a bifunctional thiol or an alcohol as the resin modifier as long as it does not impair the effect of the present invention.

The bifunctional thiol is a compound having two mercapto groups, and examples thereof include a bifunctional aliphatic thiol, a bifunctional aromatic thiol, and a combination thereof.

Examples of the bifunctional aliphatic thiol include methanedithiol, 1,2-ethanedithiol, 1,2-propanedithiol, 1,3-propanedithiol, 1,4-butanedithiol, 1,5-pentanedithiol, 1,6-hexanedithiol, 1,2-cyclohexanedithiol, 3,4-dimethoxybutane-1,2-dithiol, 2-methylcyclohexane-2,3-dithiol, 1,2-dimercaptopropylmethylether, 2,3-dimercaptopropylmethylether, bis(2-mercaptoethyl)ether, bis(mercaptomethyl)sulfide, bis(mercaptomethyl)disulfide, bis(mercaptoethyl) sulfide, bis(mercaptoethyl)disulfide, bis(mercaptomethylthio)methane, bis(2-mercaptoethylthio) methane, 1,2-bis(mercaptomethylthio)ethane, 1,2-bis(2-mercaptoethylthio)ethane, 1,3-bis(mercaptomethylthio) propane, 1,3-bis(2-mercaptoethylthio)propane, 4,6-bis(mercaptomethylthio)-1,3-dithiane, 2-(2,2-bis(mercaptomethylthio)ethyl)-1,3-dithiethane, 2,5-dimercapto-1,4-dithiane, ethylene glycol bis(2-mercaptoacetate), ethylene glycol bis(3-mercaptopropionate), diethylene glycol(2-mercaptoacetate), diethylene glycol(3-mercaptopropionate), 1,4-cyclohexanediol bis(2-mercaptoacetate), and 1,4-cyclohexanediol bis(3-mercaptopropionate), and the like.

Examples of the bifunctional aromatic thiol include 1,2-dimercaptobenzene, 1,3-dimercaptobenzene, 1,4-dimercaptobenzene, 1,2-bis(mercaptomethyl)benzene, 1,4-bis(mercaptomethyl)benzene, 1,2-bis(mercaptoethyl)benzene, 1,4-bis(mercaptoethyl)benzene, 2,5-toluenedithiol, 3,4-toluenedithiol, 1,4-naphthalenedithiol, 1,5-naphthalenedithiol, 2,6-naphthalenedithiol, 2,7-naphthalenedithiol, 2,2'-dimercaptobiphenyl, and 4,4'-dimercaptobiphenyl, and the like.

Examples of the alcohol include an alcohol having two or more hydroxyl groups, an alcohol having a mercapto group, and a combination thereof.

Examples of the alcohol having two or more hydroxyl groups include ethylene glycol, diethylene glycol, triethylene glycol, propylene glycol, dipropylene glycol, tripropylene glycol, 1,2-butanediol, 1,3-propanediol, 1,4-butanediol, 1,5-pentanediol, 1,6-hexanediol, glycerol, diglycerol, polyglycerol, trimethylolethane, trimethylolpropane, di(trimethylolpropane)pentaerythritol, dipentaerythritol, sorbitol, xylitol, dihydroxybenzene, benzenetriol, bisphenol A, bisphenol F, xylylene glycol, di(2-hydroxyethoxy)benzene, bisphenol A-bis(2-hydroxyethylether), an ethylene oxide adduct of glycerol, an ethylene oxide adduct of trimethylolpropane, an ethylene oxide adduct of pentaerythritol, a propylene oxide adduct of glycerol, a propylene oxide adduct of trimethylolpropane, a propylene oxide adduct of pentaerythritol, caprolactone-modified glycerol, caprolactone-modified trimethylolpropane, and caprolactone-modified pentaerythritol, and the like.

Examples of the alcohol having a mercapto group include 2-mercaptoethanol, 3-mercapto-1,2-propanediol, glycerine-1,3-di(3-mercaptopropionate), 1-hydroxy-4-mercaptocyclohexane, 1,3-dimercapto-2-propanol, 2,3-dimercapto-1-propanol, 1,2-dimercapto-1,3-butanediol, pentaerythritol-tris(3-mercaptopropionate), pentaerythritol-mono(3-mercaptopropionate), pentaerythritol-bis(3-mercaptopropionate), pentaerythritol-tris(thioglycolate), bis(2-mercaptoacetate) malate, and 2-(2-mercaptoethylthio) ethanol, and the like.

The resin modifier does not include an episulfide.

Since the episulfide exhibits excessively high reactivity with the amine (A), striae may occur in the resin obtained by uneven curing, and the transparency of the resin may be deteriorated.

In the polymerizable composition for an optical material according to the present invention, from the viewpoint of the above-mentioned effects, it is preferred to use any combination of exemplified compounds as the amine (A), the isocyanate (B) and the thiol (C).

In the polymerizable composition for an optical material according to the present invention, the ratio (a/b) of the molar number a of amino groups in the amine (A) with respect to the molar number b of isocyanato groups in the isocyanate (B) is 0.10 to 0.60, preferably 0.10 to 0.55, more preferably 0.10 to 0.50, particularly preferably 0.15 to 0.50, and most preferably 0.15 to 0.30.

When the amine (A), the isocyanate (B) and the thiol (C) are combined and the above-specified molar number ratio is satisfied, it is possible to more suitably obtain a high-refractive index thiourethane urea molded product having a low specific gravity, an excellent heat resistance, an excellent impact resistance and an excellent light resistance, and also exhibiting suppressed occurrence of optical distortion (striae) due to a long pot life of the polymerizable composition, that is, a thiourethane urea molded product having a superior balance of these properties. The polymerizable composition for an optical material according to the present invention can exhibit the effect of the present invention as described above, and is capable of providing a resin suitable as an eyeglass lens.

Further, in view of the effect of the present invention, the ratio ((a+c)/b) of the total molar number (a+c) of the molar number a of amino groups in the amine (A) and the molar number of mercapto groups c in the thiol (C) with respect to the molar number b of isocyanato groups in the isocyanate (B) is 0.70 to 1.30, preferably 0.70 to 1.20, and more preferably 0.90 to 1.10.

These molar ratios (a/b, and (a+c)/b) may be appropriately selected and combined.

<Method for Preparing Polymerizable Composition>

A method for preparing the polymerizable composition for an optical material according to the present invention includes a step (i) of reacting an amine (A) having two or more secondary amino groups and an isocyanate (B) having two or more isocyanato groups to obtain a prepolymer, and a step (ii) of adding and mixing a thiol (C) into the prepolymer. Hereinafter, individual steps will be described.

[Step (i)]

In the step (i), a predetermined amount of the amine (A) in one portion or divided portions is charged into the isocyanate (B), followed by reaction thereof. The ratio (a/b) of the molar number a of amino groups in the amine (A) with respect to the molar number b of isocyanato groups in the isocyanate (B) is 0.10 to 0.60, preferably 0.10 to 0.55, more preferably 0.10 to 0.50, particularly preferably 0.15 to 0.50, and most preferably 0.15 to 0.30.

When the amine (A), the isocyanate (B) and the thiol (C) are simultaneously mixed, reaction heat is increased, resulting in the shortening of a pot life. Therefore, the workability until performing casting is decreased, and there is a case where striae are generated in the resulting resin molded product. Further, since the polymerization progresses before the components are uniformly dissolved, there is a case where a resin molded product with impaired transparency is obtained. As in the present invention, according to the polymerizable composition obtained by reacting the amine (A) and the isocyanate (B) to obtain a prepolymer, and then adding and mixing the thiol (C) into the prepolymer, it is possible to suitably obtain a resin molded product exhibiting excellent transparency and suppression of striae.

In the case of using an amine having two or more primary amino groups as the amine, because such an amine has higher reactivity when compared with the amine (A) having two or more secondary amino groups, rapid heat generation is observed when prepolymerizing with the isocyanate (B). In addition, a prepolymer obtained by crosslinking becomes highly viscous since the primary amino groups react with two isocyanato groups, thus decreasing the workability. Further, due to generation of white insoluble components depending on the type of the isocyanate (B) to be used, there is a case where the resulting product is unsuitable for transparent resin applications.

In contrast, according to the method for producing a polymerizable composition for an optical material of the present invention, workability is excellent in that a prepolymer is obtained by reacting the amine (A) having two or more secondary amino groups and the isocyanate (B) having two or more isocyanato groups, and in that rapid heat generation or an increase in viscosity is not observed, and further occurrence of white insoluble components is suppressed, whereby it is possible to obtain an resin molded product having excellent transparency.

The reaction of the amine (A) with the isocyanate (B) may be carried out in the presence of an additive. Since the reaction temperature varies depending on the type or amount of the compound and additives to be used and properties of the prepolymer to be produced, it is not intended to be uniformly defined and is appropriately selected in consideration of operability, safety, convenience and the like.

[Step (ii)]

In the step (ii), the thiol (C) is further added and mixed into the prepolymer obtained in the step (i), thereby obtaining a polymerizable composition. Since the mixing temperature varies depending on the compound to be used, it is not intended to be uniformly defined and is appropriately selected in consideration of operability, safety, convenience, and the like. The mixing temperature is preferably 25° C. or lower. Heating may be carried out depending on the solubility of the compound to be used. The heating temperature is determined in consideration of stability and safety of the compound.

In the case where a prepolymer is obtained from the isocyanate (B) and the thiol (C) in the step (i), and the amine (A) is added and mixed into the prepolymer obtained in the step (i) to obtain a polymerizable composition in the subsequent step (ii), since isocyanato residues remain in the prepolymer obtained in the step (i), the heat of reaction with the amine (A) becomes greater, thus resulting in the shortening of a pot life. Therefore, along with significant deterioration of the workability until performing the casting, striae may occur in the resulting resin molded product.

In contrast, according to the method for producing a polymerizable composition for an optical material of the present invention, since a prepolymer is obtained by reacting the amine (A) and the isocyanate (B) in the above-specified range of molar ratio a/b in the step i, and almost no amino groups of the amine (A) remain, the above-mentioned problems do not occur.

The method for producing a thiourethane urea molded product according to the present invention is not particularly limited, but a preferred production method may be, for example, casting polymerization. A polymerizable composition is injected into a molding mold which is held by a gasket or tape. Depending on physical properties required for the resulting plastic lens, it is preferred to carry out a degassing treatment under reduced pressure, a filtration treatment such as pressurization or depressurization, or the like, as needed.

The polymerization conditions for producing the thiourethane urea molded product of the present invention significantly vary depending on the type of the compound to be used, the type and amount of the catalyst to be used, the shape of the mold to be used, or the like, and therefore are not intended to be uniformly defined. The polymerization is carried out at a temperature of 0° C. to 140° C. over a period of 1 to 50 hours. In some cases, the polymerization is carried out by holding or gradually heating in the temperature range of 10° C. to 140° C. and curing for 1 to 48 hours. After demolding, a treatment such as annealing may be carried out, if necessary. The treatment is usually carried out at a temperature of 50° C. to 150° C., preferably 90° C. to 140° C., and more preferably 100° C. to 130° C.

<Molded Product and Uses>

The thiourethane urea molded product according to the present invention is obtained from the polymerizable composition for an optical material according to the present invention, and can be obtained in various shapes by changing a mold during casting polymerization. The thiourethane urea molded product according to the present invention has high transparency, and can be used for various uses as an optical resin, such as a plastic lens, a camera lens, a light emitting diode (LED), a prism, an optical fiber, an information recording substrate, a filter, and a light emitting diode. In particular, the thiourethane urea molded product according to the present invention is suitable as an optical material or an optical element for a plastic lens, a camera lens, a light emitting diode, or the like.

The plastic lens using the thiourethane urea molded product of the present invention may be used with the formation of a coating layer over one side or both sides thereof, if desired. Examples of the coating layer include a primer layer, a hard coating layer, an anti-reflection layer, an anti-fog coating layer, an anti-fouling layer, and a water-repellent layer. These coating layers may be used alone or as a multilayered structure of plural coating layers. In the case where coating layers are formed on both sides of the plastic lens, the same or different coating layers may be formed on each side.

In each of these coating layers, an ultraviolet absorber for protecting a lens and an eye from ultraviolet rays; an infrared absorber for protecting an eye from infrared rays; a light stabilizer or an antioxidant for improving the weather resistance of the lens; a dye or a pigment for improving the fashionability of the lens; and a photochromic dye, a photochromic pigment, an anti-static agent, and other known additives for improving the performance of the lens may be used in a combination thereof. For a layer which is coated by application, various leveling agents for improving the coatability may be used.

Typically, the primer layer is formed between a hard coating layer described below and an optical lens. The primer layer is a coating layer for improving the adhesiveness between the hard coating layer and the lens which are formed thereon, and can improve impact resistance in some cases. The primer layer can be formed of any material as long as the material has high adhesiveness to the obtained optical lens. Typically, for example, a primer composition containing a urethane resin, an epoxy resin, a polyester resin, a melanin resin, or polyvinyl acetal as a main component is used. In the primer composition, an appropriate solvent which does not affect the lens may be used to adjust the viscosity of the composition. Of course, a solvent is not necessarily used.

The primer composition can be formed using any method such as a coating method or a dry method. In the case where the coating method is used, a primer layer is formed by coating the lens with the primer composition using a known coating method such as spin coating or dip coating and then solidifying the primer composition. In the case where the dry method is used, the primer layer is formed using a known dry method such as a CVD method or a vacuum deposition method. During the formation of the primer layer, in order to improve the adhesiveness, the surface of the lens may be optionally subjected to a pre-treatment such as an alkaline treatment, a plasma treatment, or an ultraviolet treatment.

The hard coating layer is a coating layer for imparting scratch resistance, abrasion resistance, moisture resistance, resistance to hot water, heat resistance, and weather resistance to the lens surface.

In general, the hard coating layer is formed of a hard coating composition containing an organic silicon compound having curability and one or more oxide fine particles of elements selected from the element group consisting of Si, Al, Sn, Sb, Ta, Ce, La, Fe, Zn, W, Zr, In and Ti and/or one or more fine particles of composite oxides which are formed of two or more elements selected from the above element group.

It is preferred that the hard coating composition further contains at least one of amines, amino acids, metal acetylacetonate complexes, organic acid metal salts, perchloric acids, salts of perchloric acids, acids, metal chlorides, and polyfunctional epoxy compounds, in addition to the above-described components. In the hard coating composition, an appropriate solvent which does not affect the lens may be used. Of course, a solvent is not necessarily used.

Typically, the hard coating layer is formed by coating the lens with the hard coating composition using a known coating method such as spin coating or dip coating and curing the hard coating composition. Examples of a curing method include a method of curing by thermal curing, or irradiation with energy beams such as ultraviolet rays or visible rays. In order to suppress the generation of interference fringes, the difference in refractive index between the hard coating layer and the lens is preferably within a range of ±0.1.

Typically, the anti-reflection layer is optionally formed on the hard coating layer. The anti-reflection layer is an inorganic or organic layer. In the case where the anti-reflection layer is an inorganic layer, this inorganic layer is formed of an inorganic oxide such as $SiO_2$ or $TiO_2$ using a dry method such as a vacuum deposition method, a sputtering method, an ion plating method, an ion beam assisted method, or a CVD method. In the case where the anti-reflection layer is an organic layer, this organic layer is formed of a composition containing an organic silicon compound and silica fine particles having internal cavities using a wet method.

The anti-reflection layer is composed of a single layer or multiple layers. In the case where the anti-reflection layer is a single layer, it is preferable that the refractive index is lower than that of the hard coating layer by at least 0.1 or more. In order to efficiently exhibit an anti-reflection function, it is preferable that the anti-reflection layer is a multilayered anti-reflection film. In this case, a low-refractive-index film and a high-refractive-index film are alternately laminated. In this case, the difference in refractive index between the low-refractive-index film and the high-refractive-index film is preferably 0.1 or more. Examples of the high-refractive-index film include films of ZnO, $TiO_2$, $CeO_2$, $Sb_2O_5$, $SnO_2$, $ZrO_2$, and $Ta_2O_5$. Examples of the low-refractive-index film include a $SiO_2$ film.

Optionally, an anti-fog coating layer, an anti-fouling layer, and a water-repellent layer may be formed on the anti-reflection layer. The method of forming an anti-fog coating layer, an anti-fouling layer or a water-repellent layer is not particularly limited in terms of the treatment method, the treatment material, and the like, as long as these factors do not bring adverse influence on the function of preventing reflection, and known anti-fog coating treatment method, anti-fouling treatment method, water repellent treatment method, and materials can be used. Examples of the anti-fog coating treatment method and the anti-fouling treatment method include a method of covering the surface with a surfactant, a method of adding a hydrophilic film to the surface to impart water absorbency thereto, a method of covering the surface with fine convex and concave portions to improve water absorbency, a method of imparting water absorbency to the surface using photocatalytic activities, and a method of performing a super water-repellent treatment on the surface to prevent attachment of water droplets thereon. In addition, examples of the water-repellent treatment method include a method of forming a water-repellent treatment layer by vapor deposition or sputtering of a fluorine-containing silane compound or the like; and a method of forming a water-repellent treatment layer by dissolving a fluorine-containing silane compound in a solvent and applying the solution.

The plastic lens using the thiourethane urea molded product according to the present invention may be dyed with a dye according to the purpose in order to impart fashionability, photochromicity, and the like. The lens can be dyed using a known dyeing method but typically is dyed using the following method.

In a typical method, a lens material having a predetermined finished optical surface is dipped (dyeing step) in a dye solution in which a dye to be used is dissolved or is uniformly dispersed, and then the lens is optionally heated to fix the dye (post-dyeing annealing step). The dye used in the dyeing step is not particularly limited as long as it is a known dye. Typically, an oil-soluble dye or a disperse dye is used. A solvent used in the dyeing step is not particularly limited as long as the dye used is soluble or is uniformly dispersible therein. In this dyeing step, optionally a surfactant for dispersing the dye in the dye solution or a carrier for promoting dyeing may be added. In the dyeing step, the dye and the surfactant which is optionally added are dispersed in water or a mixture of water and an organic solvent to prepare a dye bath, and the optical lens is dipped in this dye bath to carry out dyeing of the lens at a predetermined temperature for a predetermined amount of time. The dyeing temperature and time vary depending on a desired coloration density. Typically, the dyeing is performed at 120° C. or lower for several minutes to several tens of hours at a dye concentration in the dye bath of 0.01 to 10 wt %. In addition, in the case where it is difficult to perform the dyeing, the dyeing is performed under pressure. The post-dyeing annealing step which is carried out according to necessity is a step of performing a heat treatment to the dyed lens material. The heat treatment is performed such that the water remaining on the surface of the lens material which has been dyed in the dyeing step, is removed using a solvent or the like, or the solvent is air-dried, and then the lens material is retained in a furnace such as an infrared heating furnace in an air atmosphere or a resistance heating furnace, for a predetermined time. The post-dyeing annealing step prevents fading of the dyed lens material (anti-fading treatment), and also removes moisture that has penetrated inside the lens material during dyeing.

In addition, eyeglass plastic lenses may be stored in a state of being packed for a relatively long period of time, and consequently there may be problems in quality. For example, during the storage of lenses, the shape thereof changes due to scratches or moisture absorption, or the colors of left and right lenses change and are different from each other due to a difference in the storage period of the lenses.

In this case, such problems may be solved and improved using known packaging techniques (for example, Japanese Laid-open Patent Publication No. 2007-99313, Japanese Laid-open Patent Publication No. 2007-24998, and Japanese Laid-open Patent Publication No. H09-216674).

Specific examples of the packaging techniques include a method of sealing and storing a lens in a packaging material which is formed of a material having properties (gas barrier properties) of suppressing permeation of oxygen or oxygen and water vapor and is filled with an inert gas; a method of sealing and storing a lens in a packaging material which is formed of a material having properties (gas barrier properties) of suppressing permeation of oxygen or oxygen and water vapor together with a deoxygenating agent; and a method of sealing a lens in a vacuum.

As the deoxygenating agent, a known one may be used, in which, for example, a deoxygenating agent composition which absorbs oxygen is packed in a packaging material having gas permeability. As the deoxygenating agent composition, for example, a composition which absorbs oxygen using an oxidation reaction of a reducing metal may be used. Examples of the deoxygenating agent using such a deoxygenating agent composition include a moisture-dependent deoxygenating agent in which replenishment of moisture from an atmosphere is required during deoxygenation; and a self-reacting deoxygenating agent in which replenishment of moisture from an atmosphere is not required. When the self-reacting deoxygenating agent is used, the deoxygenating agent is preferably packed in a packaging material together with a desiccant (for example, silica gel). In addition, a deoxygenating agent having a deoxygenating function and a drying function at the same time may be used (for example, PHARMAKEEP (KD and KC type) manufactured by MITSUBISHI GAS CHEMICAL COMPANY, INC.). In addition, a deoxygenating agent which exhibits a deoxygenating function in a dry atmosphere without the necessity of supplying a moisture donor may be used. Examples of such a deoxygenating agent include a deoxygenating agent including a deoxygenating component which is formed of a crosslinked polymer having an unsaturated carbon-carbon bond (for example, refer to Japanese Laid-open Patent Publication No. H11-70331); a deoxygenating agent including a metal, which is obtained by activating a transition metal supported on a carrier, as a major component (for example, refer to Japanese Laid-open Patent Publication No. H08-38883); a deoxygenating agent including activated magnesium, which is obtained by supporting a magnesium compound on a carrier and reducing the supported magnesium compound, as a major component (for example, refer to Japanese Laid-open Patent Publication No. 2001-37457); and a deoxygenating agent including an oxygen absorbing composition in which a substance including a liquid hydrocarbon oligomer having an unsaturated group as a major component and including an oxygen absorption accelerating material is supported on a carrier (for example, refer to Japanese Laid-open Patent Publication No. H10-113555). Examples of a commercially available product include PHARMAKEEP (KH type) manufactured by MITSUBISHI GAS CHEMICAL COMPANY, INC.

In addition, examples of the self-reacting deoxygenating agent include a deoxygenating agent disclosed in Japanese Examined Patent Publication No. S57-31449 in which a moisture donor is present such that moisture required for deoxygenation is supplied therefrom.

The filling of a packaging material with an inert gas and the sealing of a packaging material can be carried out by evacuating air from the packaging material and filling the packaging material with the inert gas so as to replace the air inside the packaging material with the inert gas and, in this state, sealing an opening of the packaging material.

As the inert gas filling the inside of the packaging material, for example, nitrogen, argon, helium, or neon can be used. From the viewpoint of economical efficiency, nitrogen gas is preferably used.

In order to prevent deterioration such as lens deformation caused by moisture and to remove moisture in air remaining in the packaging material, a desiccant (for example, silica gel) may be enclosed in the packaging material together with a lens.

Preferred examples of the packaging material include a material having a metal foil layer, such as aluminum having low oxygen permeability, which is formed of a material capable of suppressing permeation of at least oxygen.

EXAMPLES

Hereinafter, the present invention will be described in detail with reference to Examples.

In the performance test of resins, pot life, transparency, distortion (striae), refractive index, Abbe number, specific gravity, heat resistance, impact resistance, and light resistance were evaluated by the following methods.

Pot life: The obtained polymerizable compositions were held at the mixing temperature, and all of the polymerizable compositions for an optical material were mixed. Using a B-type viscometer, the viscosity was measured at an interval of one hour from the point of time when the mixing was completed. The point of time at which the viscosity became higher than 10,000 mPa·s was evaluated.

Transparency: The obtained resin was irradiated with light using a projector in a dark place to determine whether or not fogging, an opaque material, or elution of an adhesive component from a tape was observed by visual inspection. A case where fogging, an opaque material, or elution of an adhesive component from a tape was not observed was evaluated as "O" (transparent), and a case where fogging, an opaque material, or elution of an adhesive component from a tape was observed was evaluated as "X" (not transparent).

Distortion (striae): The obtained lens was projected using a high-pressure mercury lamp, and a case where distortion was not observed in the lens was evaluated as "O" ("No striae observed)", and a case where distortion was observed in the lens was evaluated as "X" (Striae observed)"

Refractive index (ne), and Abbe number (ve): The measurement was performed using a Pulfrich refractometer at 20° C.

Specific gravity: The measurement was performed using Archimedes' principle.

Heat resistance: A glass transition temperature (Tg) in a TMA penetration method (load: 50 g; pinpoint: 0.5 mmφ, and temperature increase rate: 10° C./min) was measured.

Impact resistance: According to the US FDA standard, steel balls were dropped on a lens having a center thickness of 1 mm one by one in the order from the lightest to a heavier one from a height of 127 cm until breakage in the lens takes place. The impact resistance was evaluated according to the steel ball weight against which the lens can withstand. The dropping of steel balls was carried out in the order of 8 g→16 g→28 g→33 g→445 g→67 g→95 g→112 g→174 g→225 g→534 g.

Light resistance: AQUV test (light source: UVA-340, intensity: 0.50 W/m2, and test conditions: 50° C.×200 hours) was carried out using a 2 mm-thick plate in an accelerated weathering machine manufactured by Q-Lab. Changes in hue before and after irradiation were measured.

Example 1

51.6 parts by weight of a mixture of 2,5-bis(isocyanatomethyl)bicyclo[2.2.1]heptane and 2,6-bis(isocyanatomethyl)bicyclo[2.2.1]heptane, and 1.5 parts by weight of an ultraviolet absorber (manufactured by KYODO CHEMICAL CO., LTD.; trade name: Viosorb 583) were mixed and dissolved to prepare a homogeneous solution. This solution was warmed to 50° C., and then 12.5 parts by weight of N,N'-di(1,2,2-trimethylpropyl)-1,6-hexamethylenediamine (manufactured by ALBEMARLE Corporation; trade name: ETHACURE 90) were added dropwise thereto, followed by reaction for 1 hour. Into this solution, 0.15 parts by weight of an internal mold release agent (manufactured by Mitsui Chemicals, Inc.; trade name: internal mold release agent for MR), 0.03 parts by weight of dimethyl tin dichloride, and 35.9 parts by weight of 4-mercaptomethyl-1,8-dimercapto-3,6-dithiaoctane were mixed and dissolved to prepare a homogeneous solution. The solution was subjected to degassing at 400 Pa and then injected into a molding mold. This was introduced into a polymerization oven, and the temperature was gradually increased to 50° C. to 130° C. over 24 hours to carry out polymerization. After the polymerization was completed, the molding mold was withdrawn from the oven, followed by demolding. The releasability was good, and peeling of the mold was not observed. The resulting molded product was further subjected to an annealing treatment at 130° C. for 2 hours. The resulting molded product had transparency, no striae, a refractive index (ne) of 1.60, an Abbe number (ve) of 40, a specific gravity of 1.22, a Tg of 125° C., and light resistance ΔYI of 2.2. In the impact resistance test, the resulting molded product was not broken with a 534 g steel ball. Further, the results of the pot life test showed that the point of time at which the viscosity of the polymerizable composition became higher than 10,000 mPa·s was 3 hours later. The results are shown in Table-1.

Example 2

45.0 parts by weight of a mixture of 2,5-bis(isocyanatomethyl)bicyclo[2.2.1]heptane and 2,6-bis(isocyanatomethyl)bicyclo[2.2.1]heptane, and 1.5 parts by weight of an ultraviolet absorber (manufactured by KYODO CHEMICAL CO., LTD.; trade name: Viosorb 583) were mixed and dissolved to prepare a homogeneous solution. This solution was warmed to 50° C., and then 12.4 parts by weight of N,N'-di(1,2,2-trimethylpropyl)-1,6-hexamethylenediamine (manufactured by ALBEMARLE Corporation; trade name: ETHACURE 90) were added dropwise thereto, followed by reaction for 1 hour. Into this solution, 0.15 parts by weight of an internal mold release agent (manufactured by Mitsui Chemicals, Inc.; trade name: internal mold release agent for MR), 0.03 parts by weight of dimethyl tin dichloride, and 42.6 parts by weight of pentaerythritol tetrakis(3-mercaptopropionate) were mixed and dissolved to prepare a homogeneous solution. The solution was subjected to degassing at 400 Pa and then injected into a molding mold. This was introduced into a polymerization oven, and the temperature was gradually increased to 50° C. to 130° C. over 24 hours to carry out polymerization. After the polymerization was completed, the molding mold was withdrawn from the oven, followed by demolding. The releasability was good, and peeling of the mold was not observed. The resulting molded product was further subjected to an annealing treatment at 130° C. for 2 hours. The resulting molded product had transparency, no striae, a refractive index (ne) of 1.55, an Abbe number (ve) of 43, a specific gravity of 1.23, a Tg of 121° C., and light resistance ΔYI of 1.1. In the impact resistance test, the resulting molded product was not broken with a 534 g steel ball. Further, the results of the pot life test showed that the point of time at which the viscosity of the polymerizable composition became higher than 10,000 mPa·s was 3 hours later. The results are shown in Table-1.

Example 3

50.5 parts by weight of a mixture of 2,5-bis(isocyanatomethyl)bicyclo[2.2.1]heptane and 2,6-bis(isocyanatomethyl)bicyclo[2.2.1]heptane, and 1.5 parts by weight of an ultraviolet absorber (manufactured by KYODO CHEMICAL CO., LTD.; trade name: Viosorb 583) were mixed and dissolved to prepare a homogeneous solution. This solution was warmed to 50° C., and then 13.1 parts by weight of N,N'-di(1,2,2-trimethylpropyl)-1,6-hexamethylenediamine (manufactured by ALBEMARLE Corporation; trade name: ETHACURE 90) were added dropwise thereto, followed by reaction for 1 hour. Into this solution, 0.15 parts by weight of an internal mold release agent (manufactured by Mitsui Chemicals, Inc.; trade name: internal mold release agent for MR), 0.03 parts by weight of dimethyl tin dichloride, and 36.4 parts by weight of a mixture of 5,7-dimercaptomethyl-1,11-dimercapto-3,6,9-trithiaundecane, 4,7-dimercaptomethyl-1,11-dimercapto-3,6,9-trithiaundecane and 4,8-dimercaptomethyl-1,11-dimercapto-3,6,9-trithiaundecane were mixed and dissolved to prepare a homogeneous solution. The solution was subjected to degassing at 400 Pa and then injected into a molding mold. This was introduced into a polymerization oven, and the temperature was gradually increased to 50° C. to 140° C. over 24 hours to carry out polymerization. After the polymerization was completed, the molding mold was withdrawn from the oven, followed by demolding. The releasability was good, and peeling of the mold was not observed. The resulting molded product was further subjected to an annealing treatment at 140° C. for 2 hours. The resulting molded product had transparency, no striae, a refractive index (ne) of 1.60, an Abbe number (ve) of 40, a specific gravity of 1.22, a Tg of 130° C., and light resistance ΔYI of 2.0. In the impact resistance test, the resulting molded product was not broken with a 534 g steel ball. Further, the results of the pot life test showed that the point of time at which the viscosity of the polymerizable composition became higher than 10,000 mPa·s was 3 hours later. The results are shown in Table-1.

Example 4

50.3 parts by weight of a mixture of 2,5-bis(isocyanatomethyl)bicyclo[2.2.1]heptane and 2,6-bis(isocyanatomethyl)bicyclo[2.2.1]heptane, and 1.5 parts by weight of an ultraviolet absorber (manufactured by KYODO CHEMICAL CO., LTD.; trade name: Viosorb 583) were mixed and dissolved to prepare a homogeneous solution. This solution was warmed to 50° C., and 15.8 parts by weight of N,N'-di-sec-butyl-4,4'-methylene-bis(cyclohexylamine) (manufactured by Dorf Ketal Specialty Catalysts, LLC.; trade name: CLEARLINK 1000) were added dropwise thereto, followed by reaction for 1 hour. Into this solution, 0.15 parts by weight of an internal mold release agent (manufactured by Mitsui Chemicals, Inc.; trade name: internal mold release agent for MR), 0.03 parts by weight of dimethyl tin dichloride, and 33.9 parts by weight of 4-mercaptomethyl-1,8-dimercapto-3,6-dithiaoctane were mixed and dissolved to prepare a homogeneous solution. The solution was subjected to degassing at 400 Pa and then injected into a molding mold. This was introduced into a polymerization oven, and the temperature was gradually increased to 50° C. to 140° C. over 24 hours to carry out polymerization. After the polymerization was completed, the molding mold was withdrawn from the oven, followed by demolding. The releasability was good, and peeling of the mold was not observed. The resulting molded product was further subjected to an annealing treatment at 140° C. for 2 hours. The resulting molded product had transparency, no striae, a refractive index (ne) of 1.60, an Abbe number (ve) of 41, a specific gravity of 1.22, a Tg of 134° C., and light resistance ΔYI of 1.8. In the impact resistance test, the resulting molded product was not broken with a 534 g steel ball. Further, the results of the pot life test showed that the point of time at which the viscosity of the polymerizable composition became higher than 10,000 mPa·s was 2 hours later. The results are shown in Table-1.

Example 5

52.1 parts by weight of a mixture of 2,5-bis(isocyanatomethyl)bicyclo[2.2.1]heptane and 2,6-bis(isocyanatomethyl)bicyclo[2.2.1]heptane, and 1.5 parts by weight of an ultraviolet absorber (manufactured by KYODO CHEMICAL CO., LTD.; trade name: Viosorb 583) were mixed and dissolved to prepare a homogeneous solution. This solution was warmed to 50° C., and then 12.8 parts by weight of N,N'-di-isopropyl-isophorone diamine (manufactured by HUNTSMAN INTERNATIONAL LLC.; trade name: JEF-FLINK 754) were added dropwise thereto, followed by reaction for 1 hour. Into this solution, 0.15 parts by weight of an internal mold release agent (manufactured by Mitsui Chemicals, Inc.; trade name: internal mold release agent for MR), 0.03 parts by weight of dimethyl tin dichloride, and 35.1 parts by weight of 4-mercaptomethyl-1,8-dimercapto-3,6-dithiaoctane were mixed and dissolved to prepare a homogeneous solution. The solution was subjected to degassing at 400 Pa and then injected into a molding mold. This was introduced into a polymerization oven, and the temperature was gradually increased to 50° C. to 140° C. over 24 hours to carry out polymerization. After the polymerization was completed, the molding mold was withdrawn from the oven, followed by demolding. The releasability was good, and peeling of the mold was not observed. The resulting molded product was further subjected to an annealing treatment at 140° C. for 2 hours. The resulting molded product had transparency, no striae, a refractive index (ne) of 1.60, an Abbe number (ve) of 40, a specific gravity of 1.23, a Tg of 132° C., and light resistance ΔYI of 2.0. In the impact resistance test, the resulting molded product was not broken with a 225 g steel ball. Further, the results of the pot life test showed that the point of time at which the viscosity of the polymerizable composition became higher than 10,000 mPa·s was 2 hours later. The results are shown in Table-1.

Example 6

20.6 parts by weight of m-xylylene diisocyanate, 33.2 parts by weight of 4,4'-methylene-bis(cyclohexyl isocyanate), and 1.5 parts by weight of an ultraviolet absorber (manufactured by KYODO CHEMICAL CO., LTD.; trade name: Viosorb 583) were mixed and dissolved to prepare a homogeneous solution. This solution was warmed to 50° C., and 13.4 parts by weight of N,N'-di(1,2,2-trimethylpropyl)-1,6-hexamethylenediamine (manufactured by ALBEMARLE Corporation; trade name: ETHACURE 90) were added dropwise thereto, followed by reaction for 1 hour. Into this solution, 0.15 parts by weight of an internal mold release agent (manufactured by Mitsui Chemicals, Inc.; trade name: internal mold release agent for MR), 0.03 parts by weight of dimethyl tin dichloride, and 32.8 parts by weight of 4-mercaptomethyl-1,8-dimercapto-3,6-dithiaoctane were mixed and dissolved to prepare a homogeneous solution. The solution was subjected to degassing at 400 Pa and then injected into a molding mold. This was introduced into a polymerization oven, and the temperature was gradually increased to 50° C. to 130° C. over 24 hours to carry out polymerization. After the polymerization was completed, the molding mold was withdrawn from the oven, followed by demolding. The releasability was good, and peeling of the mold was not observed. The resulting molded product was further subjected to an annealing treatment at 130° C. for 2 hours. The resulting molded product had transparency, no striae, a refractive index (ne) of 1.60, an Abbe number (ve) of 38, a specific gravity of 1.20, a Tg of 114° C., and light resistance ΔYI of 1.6. In the impact resistance test, the resulting molded product was not broken with a 534 g steel ball. Further, the results of the pot life test showed that the point of time at which the viscosity of the polymerizable composition became higher than 10,000 mPa·s was 2 hours later. The results are shown in Table-1.

Example 7

58.7 parts by weight of 4,4'-methylene-bis(cyclohexyl isocyanate), and 1.5 parts by weight of an ultraviolet absorber (manufactured by KYODO CHEMICAL CO., LTD.; trade name: Viosorb 583) were mixed and dissolved to prepare a homogeneous solution. This solution was warmed to 50° C., and then 6.3 parts by weight of N,N'-di(1,2,2-trimethylpropyl)-1,6-hexamethylenediamine (manufactured by ALBEMARLE Corporation; trade name: ETHACURE 90) were added dropwise thereto, followed by reaction for 1 hour. Into this solution, 0.15 parts by weight of an internal mold release agent (manufactured by Mitsui Chemicals, Inc.; trade name: internal mold release agent for MR), 0.20 parts by weight of dimethyl tin dichloride, and 35.0 parts by weight of 4-mercaptomethyl-1,8-dimercapto-3,6-dithiaoctane were mixed and dissolved to prepare a homogeneous solution. The solution was subjected to degassing at 400 Pa and then injected into a molding mold. This was introduced into a polymerization oven, and the temperature was gradually increased to 50° C. to 140° C. over 24 hours to carry out polymerization. After the polymerization was completed, the molding mold was withdrawn from the oven, followed by demolding. The releasability was good, and peeling of the mold was not observed. The resulting molded product was further subjected to an annealing treatment at 140° C. for 2 hours. The resulting molded product had transparency, no striae, a refractive index (ne) of 1.59, an Abbe number (ve) of 41, a specific gravity of 1.15, a Tg of 125° C., and light resistance ΔYI of 1.4. In the impact resistance test, the resulting molded product was not broken with a 225 g steel ball. Further, the results of the pot life test showed that the point of time at which the viscosity of the polymerizable composition became higher than 10,000 mPa·s was 3 hours later. The results are shown in Table-1.

Example 8

57.3 parts by weight of 4,4'-methylene-bis(cyclohexyl isocyanate), and 1.5 parts by weight of an ultraviolet absorber (manufactured by KYODO CHEMICAL CO., LTD.; trade name: Viosorb 583) were mixed and dissolved to prepare a homogeneous solution. This solution was warmed to 50° C., and then 12.4 parts by weight of N,N'-di(1,2,2-trimethylpropyl)-1,6-hexamethylenediamine (manufactured by ALBEMARLE Corporation; trade name: ETHACURE 90) were added dropwise thereto, followed by reaction for 1 hour. Into this solution, 0.15 parts by weight of an internal mold release agent (manufactured by Mitsui Chemicals, Inc.; trade name: internal mold release agent for MR), 0.20 parts by weight of dimethyl tin dichloride, and 30.3 parts by weight of 4-mercaptomethyl-1,8-dimercapto-3,6-dithiaoctane were mixed and dissolved to prepare a homogeneous solution. The solution was subjected to degassing at 400 Pa and then injected into a molding mold. This was introduced into a polymerization oven, and the temperature was gradually increased to 50° C. to 140° C. over 24 hours to carry out polymerization. After the polymerization was completed, the molding mold was withdrawn from the oven, followed by demolding. The releasability was good, and peeling of the mold was not observed. The resulting molded product was further subjected to an annealing treatment at 140° C. for 2 hours. The resulting molded product had transparency, no striae, a refractive index (ne) of 1.57, an Abbe number (ve) of 41, a specific gravity of 1.16, a Tg of 126° C., and light resistance ΔYI of 1.6. In the impact resistance test, the resulting molded product was not broken with a 534 g steel ball. Further, the results of the pot life test showed that the point of time at which the viscosity of the polymerizable composition became higher than 10,000 mPa·s was 3 hours later. The results are shown in Table-1.

Example 9

58.0 parts by weight of 4,4'-methylene-bis(cyclohexyl isocyanate), and 1.5 parts by weight of an ultraviolet absorber (manufactured by KYODO CHEMICAL CO., LTD.; trade name: Viosorb 583) were mixed and dissolved to prepare a homogeneous solution. This solution was warmed to 50° C., and then 11.3 parts by weight of N,N'-di-isopropyl-isophorone diamine (manufactured by HUNTSMAN INTERNATIONAL LLC.; trade name: JEFFLINK 754) were added dropwise thereto, followed by reaction for 1 hour. Into this solution, 0.15 parts by weight of an internal mold release agent (manufactured by Mitsui Chemicals, Inc.; trade name: internal mold release agent for MR), 0.20 parts by weight of dimethyl tin dichloride, and 30.7 parts by weight of 4-mercaptomethyl-1,8-dimercapto-3,6-dithiaoctane were mixed and dissolved to prepare a homogeneous solution. The solution was subjected to degassing at 400 Pa and then injected into a molding mold. This was introduced into a polymerization oven, and the temperature was gradually increased to 50° C. to 140° C. over 24 hours to carry out polymerization. After the polymerization was completed, the molding mold was withdrawn from the oven, followed by demolding. The releasability was good, and peeling of the mold was not observed. The resulting molded product was further subjected to an annealing treatment at 140° C. for 2 hours. The resulting molded product had transparency, no striae, a refractive index (ne) of 1.58, an Abbe number (ve) of 41, a specific gravity of 1.17, a Tg of 140° C., and light resistance ΔYI of 1.4. In the impact resistance test, the resulting molded product was not broken with a 534 g steel ball. Further, the results of the pot life test showed that the point of time at which the viscosity of the polymerizable composition became higher than 10,000 mPa·s was 3 hours later. The results are shown in Table-1.

Example 10

50.1 parts by weight of 1,3-bis(isocyanatomethyl)cyclohexane, and 1.5 parts by weight of an ultraviolet absorber (manufactured by KYODO CHEMICAL CO., LTD.; trade name: Viosorb 583) were mixed and dissolved to prepare a homogeneous solution. This solution was warmed to 50° C., and then 12.8 parts by weight of N,N'-di(1,2,2-trimethylpropyl)-1,6-hexamethylenediamine (manufactured by ALBEMARLE Corporation; trade name: ETHACURE 90) were added dropwise thereto, followed by reaction for 1 hour. Into this solution, 0.15 parts by weight of an internal mold release agent (manufactured by Mitsui Chemicals, Inc.; trade name: internal mold release agent for MR), 0.03 parts by weight of dimethyl tin dichloride, and 37.1 parts by weight of 4-mercaptomethyl-1,8-dimercapto-3,6-dithiaoctane were mixed and dissolved to prepare a homogeneous solution. The solution was subjected to degassing at 400 Pa and then injected into a molding mold. This was introduced into a polymerization oven, and the temperature was gradually increased to 50° C. to 130° C. over 24 hours to carry out polymerization. After the polymerization was completed, the molding mold was withdrawn from the oven, followed by demolding. The releasability was good, and peeling of the mold was not observed. The resulting molded product was further subjected to an annealing treatment at 130° C. for 2 hours. The resulting molded product had transparency, no striae, a refractive index (ne) of 1.60, an Abbe number (ve) of 40, a specific gravity of 1.22, a Tg of 122° C., and light resistance ΔYI of 1.8. In the impact resistance test, the resulting molded product was not broken with a 534 g steel ball. Further, the results of the pot life test showed that the point of time at which the viscosity of the polymerizable composition became higher than 10,000 mPa·s was 3 hours later. The results are shown in Table-1.

Example 11

50.1 parts by weight of 1,4-bis(isocyanatomethyl)cyclohexane, and 1.5 parts by weight of an ultraviolet absorber (manufactured by KYODO CHEMICAL CO., LTD.; trade name: Viosorb 583) were mixed and dissolved to prepare a homogeneous solution. This solution was warmed to 50° C., and then 12.8 parts by weight of N,N'-di(1,2,2-trimethylpropyl)-1,6-hexamethylenediamine (manufactured by ALBEMARLE Corporation; trade name: ETHACURE 90) were added dropwise thereto, followed by reaction for 1 hour. Into this solution, 0.15 parts by weight of an internal mold release agent (manufactured by Mitsui Chemicals, Inc.; trade name: internal mold release agent for MR), 0.03 parts by weight of dimethyl tin dichloride, and 37.1 parts by weight of 4-mercaptomethyl-1,8-dimercapto-3,6-dithiaoctane were mixed and dissolved to prepare a homogeneous solution. The solution was subjected to degassing at 400 Pa and then injected into a molding mold. This was introduced into a polymerization oven, and the temperature was gradually increased to 50° C. to 130° C. over 24 hours to carry out polymerization. After the polymerization was completed, the molding mold was withdrawn from the oven, followed by demolding. The releasability was good, and peeling of the mold was not observed. The resulting molded product was further subjected to an annealing treatment at 130° C. for 2 hours. The resulting molded product had transparency, no striae, a refractive index (ne) of 1.60, an Abbe number (ve) of 40, a specific gravity of 1.22, a Tg of 121° C., and light resistance ΔYI of 1.9. In the impact resistance test, the resulting molded product was not broken with a 534 g steel ball. Further, the results of the pot life test showed that the point of time at which the viscosity of the polymerizable composition became higher than 10,000 mPa·s was 3 hours later. The results are shown in Table-1.

Example 12

44.8 parts by weight of 1,6-hexamethylene diisocyanate, and 1.5 parts by weight of an ultraviolet absorber (manufactured by KYODO CHEMICAL CO., LTD.; trade name: Viosorb 583) were mixed and dissolved to prepare a homogeneous solution. This solution was kept at 20° C., and then 22.8 parts by weight of N,N'-di(1,2,2-trimethylpropyl)-1,6-hexamethylenediamine (manufactured by ALBEMARLE Corporation; trade name: ETHACURE 90) were added dropwise thereto, followed by reaction for 1 hour. Into this solution, 0.15 parts by weight of an internal mold release agent (manufactured by Mitsui Chemicals, Inc.; trade name: internal mold release agent for MR), 0.20 parts by weight of dimethyl tin dichloride, and 32.4 parts by weight of 4-mercaptomethyl-1,8-dimercapto-3,6-dithiaoctane were mixed and dissolved to prepare a homogeneous solution. The solution was subjected to degassing at 400 Pa and then injected into a molding mold. This was introduced into a polymerization oven, and the temperature was gradually increased to 25° C. to 120° C. over 24 hours to carry out polymerization. After the polymerization was completed, the molding mold was withdrawn from the oven, followed by demolding. The releasability was good, and peeling of the mold was not observed. The resulting molded product was further subjected to an annealing treatment at 120° C. for 2 hours. The resulting molded product had transparency, no striae, a refractive index (ne) of 1.57, an Abbe number (ve) of 40, a specific gravity of 1.17, a Tg of 83° C., and light resistance ΔYI of 2.8. In the impact resistance test, the resulting molded product was not broken with a 534 g steel ball. Further, the results of the pot life test showed that the point of time at which the viscosity of the polymerizable composition became higher than 10,000 mPa·s was 5 hours later. The results are shown in Table-1.

Example 13

45.9 parts by weight of 1,6-hexamethylene diisocyanate, and 1.5 parts by weight of an ultraviolet absorber (manufactured by KYODO CHEMICAL CO., LTD.; trade name: Viosorb 583) were mixed and dissolved to prepare a homogeneous solution. This solution was kept at 20° C., and then 20.9 parts by weight of N,N'-di-isopropyl-isophorone diamine (manufactured by HUNTSMAN INTERNATIONAL LLC.; trade name: JEFFLINK 754) were added dropwise thereto, followed by reaction for 1 hour. Into this solution, 0.15 parts by weight of an internal mold release agent (manufactured by Mitsui Chemicals, Inc.; trade name: internal mold release agent for MR), 0.20 parts by weight of dimethyl tin dichloride, and 33.2 parts by weight of 4-mercaptomethyl-1,8-dimercapto-3,6-dithiaoctane were mixed and dissolved to prepare a homogeneous solution. The solution was subjected to degassing at 400 Pa and then injected into a molding mold. This was introduced into a polymerization oven, and the temperature was gradually increased to 25° C. to 120° C. over 24 hours to carry out polymerization. After the polymerization was completed, the molding mold was withdrawn from the oven, followed by demolding. The releasability was good, and peeling of the mold was not observed. The resulting molded product was further subjected to an annealing treatment at 120° C. for 2 hours. The resulting molded product had transparency, no striae, a refractive index (ne) of 1.58, an Abbe number (ve) of 40, a specific gravity of 1.19, a Tg of 87° C., and light resistance ΔYI of 1.7. In the impact resistance test, the resulting molded product was not broken with a 534 g steel ball. Further, the results of the pot life test showed that the point of time at which the viscosity of the polymerizable composition became higher than 10,000 mPa·s was 5 hours later. The results are shown in Table-1.

Example 14

10.6 parts by weight of a mixture of 2,5-bis(isocyanatomethyl)bicyclo[2.2.1]heptane and 2,6-bis(isocyanatomethyl)bicyclo[2.2.1]heptane, 34.5 parts by weight of 1,6-hexamethylene diisocyanate, and 1.5 parts by weight of an ultraviolet absorber (manufactured by KYODO CHEMICAL CO., LTD.; trade name: Viosorb 583) were mixed and dissolved to prepare a homogeneous solution. This solution was kept at 20° C., and then 32.6 parts by weight of N,N'-di-isopropyl-isophorone diamine (manufactured by HUNTSMAN INTERNATIONAL LLC.; trade name: JEFFLINK 754) were added dropwise thereto, followed by reaction for 1 hour. Into this solution, 0.15 parts by weight of an internal mold release agent (manufactured by Mitsui Chemicals, Inc.; trade name: internal mold release agent for MR), 0.40 parts by weight of dimethyl tin dichloride, and 22.3 parts by weight of 4-mercaptomethyl-1,8-dimercapto-3,6-dithiaoctane were mixed and dissolved to prepare a homogeneous solution. The solution was subjected to degassing at 400 Pa and then injected into a molding mold. This was introduced into a polymerization oven, and the temperature was gradually increased to 25° C. to 120° C. over 24 hours to carry out polymerization. After the polymerization was completed, the molding mold was withdrawn from the oven, followed by demolding. The releasability was good, and peeling of the mold was not observed. The resulting molded product was further subjected to an annealing treatment at 120° C. for 2 hours. The resulting molded product had transparency, no striae, a refractive index (ne) of 1.56, an Abbe number (ve) of 41, a specific gravity of 1.16, a Tg of 95° C., and light resistance ΔYI of 4.8. In the impact resistance test, the resulting molded product was not broken with a 225 g steel ball. Further, the results of the pot life test showed that the point of time at which the viscosity of the polymerizable composition became higher than 10,000 mPa·s was 2 hours later. The results are shown in Table-1.

Example 15

45.6 parts by weight of 1,6-hexamethylene diisocyanate, and 1.5 parts by weight of an ultraviolet absorber (manufactured by KYODO CHEMICAL CO., LTD.; trade name: Viosorb 583) were mixed and dissolved to prepare a homogeneous solution. This solution was kept at 20° C., and then 13.1 parts by weight of N,N'-di(1,2,2-trimethylpropyl)-1,6-hexamethylenediamine (manufactured by ALBEMARLE Corporation; trade name: ETHACURE 90) were added dropwise thereto, followed by reaction for 1 hour. Into this solution, 0.15 parts by weight of an internal mold release agent (manufactured by Mitsui Chemicals, Inc.; trade name: internal mold release agent for MR), 0.20 parts by weight of dimethyl tin dichloride, and 41.3 parts by weight of a mixture of 5,7-dimercaptomethyl-1,11-dimercapto-3,6,9-trithiaundecane, 4,7-dimercaptomethyl-1,11-dimercapto-3,6,9-trithiaundecane and 4,8-dimercaptomethyl-1,11-dimercapto-3,6,9-trithiaundecane were mixed and dissolved to prepare a homogeneous solution. The solution was subjected to degassing at 400 Pa and then injected into a molding mold. This was introduced into a polymerization oven, and the temperature was gradually increased to 25° C. to 120° C. over 24 hours to carry out polymerization. After the polymerization was completed, the molding mold was withdrawn from the oven, followed by demolding. The releasability was good, and peeling of the mold was not observed. The resulting molded product was further subjected to an annealing treatment at 120° C. for 2 hours. The resulting molded product had transparency, no striae, a refractive index (ne) of 1.60, an Abbe number (ve) of 39, a specific gravity of 1.22, a Tg of 87° C., and light resistance ΔYI of 2.5. In the impact resistance test, the resulting molded product was not broken with a 534 g steel ball. Further, the results of the pot life test showed that the point of time at which the viscosity of the polymerizable composition became higher than 10,000 mPa·s was 5 hours later. The results are shown in Table-1.

Example 16

44.7 parts by weight of 1,6-hexamethylene diisocyanate, and 1.5 parts by weight of an ultraviolet absorber (manufactured by KYODO CHEMICAL CO., LTD.; trade name: Viosorb 583) were mixed and dissolved to prepare a homogeneous solution. This solution was kept at 20° C., and then 15.4 parts by weight of N,N'-di-sec-butyl-4,4'-methylenebis(cyclohexylamine) (manufactured by Dorf Ketal Specialty Catalysts, LLC.; trade name: CLEARLINK 1000) were added dropwise thereto, followed by reaction for 1 hour. Into this solution, 0.15 parts by weight of an internal mold release agent (manufactured by Mitsui Chemicals, Inc.; trade name: internal mold release agent for MR), 0.20 parts by weight of dimethyl tin dichloride, and 39.9 parts by weight of a mixture of 5,7-dimercaptomethyl-1,11-dimercapto-3,6,9-trithiaundecane, 4,7-dimercaptomethyl-1,11-dimercapto-3,6,9-trithiaundecane and 4,8-dimercaptomethyl-1,11-dimercapto-3,6,9-trithiaundecane were mixed and dissolved to prepare a homogeneous solution. The solution was subjected to degassing at 400 Pa and then injected into a molding mold. This was introduced into a polymerization oven, and the temperature was gradually increased to 25° C. to 120° C. over 24 hours to carry out polymerization. After the polymerization was completed, the molding mold was withdrawn from the oven, followed by demolding. The releasability was good, and peeling of the mold was not observed. The resulting molded product was further subjected to an annealing treatment at 120° C. for 2 hours. The resulting molded product had transparency, no striae, a refractive index (ne) of 1.60, an Abbe number (ve) of 39, a specific gravity of 1.23, a Tg of 92° C., and light resistance ΔYI of 2.0. In the impact resistance test, the resulting molded product was not broken with a 534 g steel ball. Further, the results of the pot life test showed that the point of time at which the viscosity of the polymerizable composition became higher than 10,000 mPa·s was 5 hours later. The results are shown in Table-1.

Example 17

46.1 parts by weight of 1,6-hexamethylene diisocyanate, and 1.5 parts by weight of an ultraviolet absorber (manufactured by KYODO CHEMICAL CO., LTD.; trade name: Viosorb 583) were mixed and dissolved to prepare a homogeneous solution. This solution was kept at 20° C., and then 13.2 parts by weight of N,N'-di-isopropyl-isophorone diamine (manufactured by HUNTSMAN INTERNATIONAL LLC.; trade name: JEFFLINK 754) were added dropwise thereto, followed by reaction for 1 hour. Into this solution, 0.15 parts by weight of an internal mold release agent (manufactured by Mitsui Chemicals, Inc.; trade name: internal mold release agent for MR), 0.20 parts by weight of dimethyl tin dichloride, and 40.7 parts by weight of a mixture of 5,7-dimercaptomethyl-1,11-dimercapto-3,6,9-trithiaundecane, 4,7-dimercaptomethyl-1,11-dimercapto-3,6,9-trithiaundecane and 4,8-dimercaptomethyl-1,11-dimercapto-3,6,9-trithiaundecane were mixed and dissolved to prepare a homogeneous solution. The solution was subjected to degassing at 400 Pa and then injected into a molding mold. This was introduced into a polymerization oven, and the temperature was gradually increased to 25° C. to 120° C. over 24 hours to carry out polymerization. After the polymerization was completed, the molding mold was withdrawn from the oven, followed by demolding. The releasability was good, and peeling of the mold was not observed. The resulting molded product was further subjected to an annealing treatment at 120° C. for 2 hours. The resulting molded product had transparency, no striae, a refractive index (ne) of 1.60, an Abbe number (ve) of 39, a specific gravity of 1.23, a Tg of 91° C., and light resistance ΔYI of 1.4. In the impact resistance test, the resulting molded product was not broken with a 534 g steel ball. Further, the results of the pot life test showed that the point of time at which the viscosity of the polymerizable composition became higher than 10,000 mPa·s was 5 hours later. The results are shown in Table-1.

Example 18

48.1 parts by weight of 1,6-hexamethylene diisocyanate, and 1.5 parts by weight of an ultraviolet absorber (manufactured by KYODO CHEMICAL CO., LTD.; trade name: Viosorb 583) were mixed and dissolved to prepare a homogeneous solution. This solution was kept at 20° C., and then 9.9 parts by weight of N,N'-di-tert-butyl-ethylenediamine (manufactured by Tokyo Chemical Industry Co., Ltd.; product code D2638) were added dropwise thereto, followed by reaction for 1 hour. Into this solution, 0.15 parts by weight of an internal mold release agent (manufactured by Mitsui Chemicals, Inc.; trade name: internal mold release agent for MR), 0.20 parts by weight of dimethyl tin dichloride, and 42.0 parts by weight of a mixture of 5,7-dimercaptomethyl-1,11-dimercapto-3,6,9-trithiaundecane, 4,7-dimercaptomethyl-1,11-dimercapto-3,6,9-trithiaundecane and 4,8-dimercaptomethyl-1,11-dimercapto-3,6,9-trithiaundecane were mixed and dissolved to prepare a homogeneous solution. The solution was subjected to degassing at 400 Pa and then injected into a molding mold. This was introduced into a polymerization oven, and the temperature was gradually increased to 25° C. to 120° C. over 24 hours to carry out polymerization. After the polymerization was completed, the molding mold was withdrawn from the oven, followed by demolding. The releasability was good, and peeling of the mold was not observed. The resulting molded product was further subjected to an annealing treatment at 120° C. for 2 hours. The resulting molded product had transparency, no striae, a refractive index (ne) of 1.60, an Abbe number (ve) of 38, a specific gravity of 1.23, a Tg of 82° C., and light resistance ΔYI of 4.2. In the impact resistance test, the resulting molded product was not broken with a 225 g steel ball. Further, the results of the pot life test showed that the point of time at which the viscosity of the polymerizable composition became higher than 10,000 mPa·s was 5 hours later. The results are shown in Table-1.

Example 19

28.6 parts by weight of a mixture of 2,5-bis(isocyanatomethyl)bicyclo[2.2.1]heptane and 2,6-bis(isocyanatomethyl)bicyclo[2.2.1]heptane, 23.3 parts by weight of 1,6-hexamethylene diisocyanate, and 1.5 parts by weight of an ultraviolet absorber (manufactured by KYODO CHEMICAL CO., LTD.; trade name: Viosorb 583) were mixed and dissolved to prepare a homogeneous solution. This solution was kept at 20° C., and then 9.6 parts by weight of N,N'-di-tert-butyl-ethylenediamine (manufactured by Tokyo Chemical Industry Co., Ltd.; product code D2638) were added dropwise thereto, followed by reaction for 1 hour. Into this solution, 0.15 parts by weight of an internal mold release agent (manufactured by Mitsui Chemicals, Inc.; trade name: internal mold release agent for MR), 0.20 parts by weight of dimethyl tin dichloride, and 38.5 parts by weight of 4-mercaptomethyl-1,8-dimercapto-3,6-dithiaoctane were mixed and dissolved to prepare a homogeneous solution. The solution was subjected to degassing at 400 Pa and then injected into a molding mold. This was introduced into a polymerization oven, and the temperature was gradually increased to 25° C. to 120° C. over 24 hours to carry out polymerization. After the polymerization was completed, the molding mold was withdrawn from the oven, followed by demolding. The releasability was good, and peeling of the mold was not observed. The resulting molded product was further subjected to an annealing treatment at 120° C. for 2 hours. The resulting molded product had transparency, no striae, a refractive index (ne) of 1.60, an Abbe number (ve) of 39, a specific gravity of 1.24, a Tg of 99° C., and light resistance ΔYI of 2.9. In the impact resistance test, the resulting molded product was not broken with a 534 g steel ball. Further, the results of the pot life test showed that the point of time at which the viscosity of the polymerizable composition became higher than 10,000 mPa·s was 5 hours later. The results are shown in Table-1.

Example 20

33.8 parts by weight of 4,4'-methylene-bis(cyclohexyl isocyanate), 21.6 parts by weight of 1,6-hexamethylene diisocyanate, and 1.5 parts by weight of an ultraviolet absorber (manufactured by KYODO CHEMICAL CO., LTD.; trade name: Viosorb 583) were mixed and dissolved to prepare a homogeneous solution. This solution was kept at 20° C., and then 8.9 parts by weight of N,N'-di-tert-butyl-ethylenediamine (manufactured by Tokyo Chemical Industry Co., Ltd.; product code D2638) were added dropwise thereto, followed by reaction for 1 hour. Into this solution, 0.15 parts by weight of an internal mold release agent (manufactured by Mitsui Chemicals, Inc.; trade name: internal mold release agent for MR), 0.20 parts by weight of dimethyl tin dichloride, and 35.7 parts by weight of 4-mercaptomethyl-1,8-dimercapto-3,6-dithiaoctane were mixed and dissolved to prepare a homogeneous solution. The solution was subjected to degassing at 400 Pa and then injected into a molding mold. This was introduced into a polymerization oven, and the temperature was gradually increased to 25° C. to 120° C. over 24 hours to carry out polymerization. After the polymerization was completed, the molding mold was withdrawn from the oven, followed by demolding. The releasability was good, and peeling of the mold was not observed. The resulting molded product was further subjected to an annealing treatment at 120° C. for 2 hours. The resulting molded product had transparency, no striae, a refractive index (ne) of 1.59, an Abbe number (ve) of 40, a specific gravity of 1.21, a Tg of 105° C., and light resistance ΔYI of 2.5. In the impact resistance test, the resulting molded product was not broken with a 534 g steel ball. Further, the results of the pot life test showed that the point of time at which the viscosity of the polymerizable composition became higher than 10,000 mPa·s was 5 hours later. The results are shown in Table-1.

Comparative Example 1

54.3 parts by weight of a mixture of 2,5-bis(isocyanatomethyl)bicyclo[2.2.1]heptane and 2,6-bis(isocyanatomethyl)bicyclo[2.2.1]heptane, 45.7 parts by weight of 4-mercaptomethyl-1,8-dimercapto-3,6-dithiaoctane, 1.5 parts by weight of an ultraviolet absorber (manufactured by KYODO CHEMICAL CO., LTD.; trade name: Viosorb 583), 0.10 parts by weight of an internal mold release agent (manufactured by Mitsui Chemicals, Inc.; trade name: internal mold release agent for MR), and 0.03 parts by weight of dimethyl tin dichloride were mixed and dissolved to prepare a homogeneous solution. The solution was subjected to degassing at 400 Pa and then injected into a molding mold. This was introduced into a polymerization oven, and the temperature was gradually increased to 25° C. to 120° C. over 24 hours to carry out polymerization. After the polymerization was completed, the molding mold was withdrawn from the oven, followed by demolding. The releasability was good, and peeling of the mold was not observed. The resulting molded product was further subjected to an annealing treatment at 120° C. for 2 hours. The resulting molded product had transparency, a refractive index (ne) of 1.62, an Abbe number (ve) of 37, a specific gravity of 1.30, and a Tg of 115° C. The results are shown in Table-1.

Comparative Example 2

52.9 parts by weight of a mixture of 2,5-bis(isocyanatomethyl)bicyclo[2.2.1]heptane and 2,6-bis(isocyanatomethyl)bicyclo[2.2.1]heptane, 47.1 parts by weight of a mixture of 5,7-dimercaptomethyl-1,11-dimercapto-3,6,9-trithiaundecane, 4,7-dimercaptomethyl-1,11-dimercapto-3,6,9-trithiaundecane and 4,8-dimercaptomethyl-1,11-dimercapto-3,6,9-trithiaundecane, 1.5 parts by weight of an ultraviolet absorber (manufactured by KYODO CHEMICAL CO., LTD.; trade name: Viosorb 583), 0.10 parts by weight of an internal mold release agent (manufactured by Mitsui Chemicals, Inc.; trade name: internal mold release agent for MR), and 0.03 parts by weight of dimethyl tin dichloride were mixed and dissolved to prepare a homogeneous solution. The solution was subjected to degassing at 400 Pa and then injected into a molding mold. This was introduced into a polymerization oven, and the temperature was gradually increased to 25° C. to 130° C. over 24 hours to carry out polymerization. After the polymerization was completed, the molding mold was withdrawn from the oven, followed by demolding. The releasability was good, and peeling of the mold was not observed. The resulting molded product was further subjected to an annealing treatment at 130° C. for 2 hours. The resulting molded product had transparency, a refractive index (ne) of 1.63, an Abbe number (νe) of 37, a specific gravity of 1.31, and a Tg of 125° C. The results are shown in Table-1.

Comparative Example 3

49.2 parts by weight of 1,6-hexamethylene diisocyanate, 50.8 parts by weight of 4-mercaptomethyl-1,8-dimercapto-3,6-dithiaoctane, 1.5 parts by weight of an ultraviolet absorber (manufactured by KYODO CHEMICAL CO., LTD.; trade name: Viosorb 583), 0.10 parts by weight of an internal mold release agent (manufactured by Mitsui Chemicals, Inc.; trade name: internal mold release agent for MR), and 0.20 parts by weight of dimethyl tin dichloride were mixed and dissolved to prepare a homogeneous solution. The solution was subjected to degassing at 400 Pa and then injected into a molding mold. This was introduced into a polymerization oven, and the temperature was gradually increased to 25° C. to 120° C. over 24 hours to carry out polymerization. After the polymerization was completed, the molding mold was withdrawn from the oven, followed by demolding. The releasability was good, and peeling of the mold was not observed. The resulting molded product was further subjected to an annealing treatment at 120° C. for 2 hours. The resulting molded product had transparency, a refractive index (ne) of 1.62, an Abbe number (νe) of 38, a specific gravity of 1.29, and a Tg of 58° C. The results are shown in Table-1.

Comparative Example 4

47.8 parts by weight of 1,6-hexamethylene diisocyanate, 52.2 parts by weight of a mixture of 5,7-dimercaptomethyl-1,11-dimercapto-3,6,9-trithiaundecane, 4,7-dimercaptomethyl-1,11-dimercapto-3,6,9-trithiaundecane and 4,8-dimercaptomethyl-1,11-dimercapto-3,6,9-trithiaundecane, 1.5 parts by weight of an ultraviolet absorber (manufactured by KYODO CHEMICAL CO., LTD.; trade name: Viosorb 583), 0.10 parts by weight of an internal mold release agent (manufactured by Mitsui Chemicals, Inc.; trade name: internal mold release agent for MR), and 0.20 parts by weight of dimethyl tin dichloride were mixed and dissolved to prepare a homogeneous solution. The solution was subjected to degassing at 400 Pa and then injected into a molding mold. This was introduced into a polymerization oven, and the temperature was gradually increased to 25° C. to 120° C. over 24 hours to carry out polymerization. After the polymerization was completed, the molding mold was withdrawn from the oven, followed by demolding. The releasability was good, and peeling of the mold was not observed. The resulting molded product was further subjected to an annealing treatment at 120° C. for 2 hours. The resulting molded product had transparency, a refractive index (ne) of 1.63, an Abbe number (νe) of 40, a specific gravity of 1.30, and a Tg of 70° C. The results are shown in Table-1.

Comparative Example 5

60.1 parts by weight of 4,4'-methylene-bis(cyclohexyl isocyanate), 32.6 parts by weight of 4-mercaptomethyl-1,8-dimercapto-3,6-dithiaoctane, 1.5 parts by weight of an ultraviolet absorber (manufactured by KYODO CHEMICAL CO., LTD.; trade name: Viosorb 583), 0.20 g of dimethyl tin dichloride, and 0.15 parts by weight of an internal mold release agent (manufactured by Mitsui Chemicals, Inc.; trade name: internal mold release agent for MR) were mixed and dissolved to prepare a homogeneous solution. Into this solution, 7.3 parts by weight of a mixture of 2,4-diamino-3,5-diethyl toluene and 2,6-diamino-3,5-diethyl toluene (manufactured by ALBEMARLE Corporation; trade name: ETHACURE 100) were charged, followed by stirring at high speed to make a homogeneous solution which was then injected into a molding mold. This was introduced into a polymerization oven, and the temperature was gradually increased to 25° C. to 130° C. over 24 hours to carry out polymerization. After the polymerization was completed, the molding mold was withdrawn from the oven, followed by demolding. The releasability was good, and peeling of the mold was not observed. The resulting molded product was further subjected to an annealing treatment at 130° C. for 2 hours. The resulting molded product exhibited a lot of striae and also white turbidity, and therefore subsequent evaluation was discontinued. The results are shown in Table-1.

Comparative Example 6

59.9 parts by weight of 4,4'-methylene-bis(cyclohexyl isocyanate), 19.8 parts by weight of 4-mercaptomethyl-1,8-dimercapto-3,6-dithiaoctane, 1.5 parts by weight of an ultraviolet absorber (manufactured by KYODO CHEMICAL CO., LTD.; trade name: Viosorb 583), 0.20 g of dimethyl tin dichloride, and 0.15 parts by weight of an internal mold release agent (manufactured by Mitsui Chemicals, Inc.; trade name: internal mold release agent for MR) were mixed and dissolved to prepare a homogeneous solution. Into this solution, 20.3 parts by weight of a mixture of 2,4-diamino-3,5-diethyl toluene and 2,6-diamino-3,5-diethyl toluene (manufactured by ALBEMARLE Corporation; trade name: ETHACURE 100) were charged, followed by stirring at high speed to make a homogeneous solution which was then injected into a molding mold. This was introduced into a polymerization oven, and the temperature was gradually increased to 25° C. to 130° C. over 24 hours to carry out polymerization. After the polymerization was completed, the molding mold was withdrawn from the oven, followed by demolding. The releasability was good, and peeling of the mold was not observed. The resulting molded product was further subjected to an annealing treatment at 130° C. for 2 hours. The resulting molded product had transparency but exhibited a lot of striae. The resulting molded product had a refractive index (ne) of 1.57, an Abbe number (νe) of 40, a specific gravity of 1.20, and a Tg of 220° C. The results are shown in Table-1.

Comparative Example 7

59.2 parts by weight of 4,4'-methylene-bis(cyclohexyl isocyanate), 20.7 parts by weight of a mixture of 5,7-dimercaptomethyl-1,11-dimercapto-3,6,9-trithiaundecane, 4,7-dimercaptomethyl-1,11-dimercapto-3,6,9-trithiaundecane and 4,8-dimercaptomethyl-1,11-dimercapto-3,6,9-trithiaundecane, 1.5 parts by weight of an ultraviolet absorber (manufactured by KYODO CHEMICAL CO., LTD.; trade name: Viosorb 583), 0.20 g of dimethyl tin dichloride, and 0.15 parts by weight of an internal mold release agent (manufactured by Mitsui Chemicals, Inc.; trade name: internal mold release agent for MR) were mixed and dissolved to prepare a homogeneous solution. Into this solution, 20.1 parts by weight of a mixture of 2,4-diamino-3,5-diethyl toluene and 2,6-diamino-3,5-diethyl toluene (manufactured by ALBEMARLE Corporation; trade name: ETHACURE 100) were charged, followed by stirring at high speed to make a homogeneous solution which was then injected into a molding mold. This was introduced into a polymerization oven, and the temperature was gradually increased to 25° C. to 130° C. over 24 hours to carry out polymerization. After the polymerization was completed, the molding mold was withdrawn from the oven, followed by demolding. The releasability was good, and peeling of the mold was not observed. The resulting molded product was further subjected to an annealing treatment at 130° C. for 2 hours. The resulting molded product had transparency but exhibited a lot of striae. The resulting molded product had a refractive index (ne) of 1.57, an Abbe number (ve) of 40, a specific gravity of 1.20, and a Tg of 263° C. The results are shown in Table-1.

Comparative Example 8

61.2 parts by weight of 4,4'-methylene-bis(cyclohexyl isocyanate), 18.0 parts by weight of bis(2-mercaptoethyl) sulfide, 1.5 parts by weight of an ultraviolet absorber (manufactured by KYODO CHEMICAL CO., LTD.; trade name: Viosorb 583), 0.20 g of dimethyl tin dichloride, and 0.15 parts by weight of an internal mold release agent (manufactured by Mitsui Chemicals, Inc.; trade name: internal mold release agent for MR) were mixed and dissolved to prepare a homogeneous solution. Into this solution, 20.8 parts by weight of a mixture of 2,4-diamino-3,5-diethyl toluene and 2,6-diamino-3,5-diethyl toluene (manufactured by ALBEMARLE Corporation; trade name: ETHACURE 100) were charged, followed by stirring at high speed to make a homogeneous solution which was then injected into a molding mold. This was introduced into a polymerization oven, and the temperature was gradually increased to 25° C. to 130° C. over 24 hours to carry out polymerization. After the polymerization was completed, the molding mold was withdrawn from the oven, followed by demolding. The releasability was good, and peeling of the mold was not observed. The resulting molded product was further subjected to an annealing treatment at 130° C. for 2 hours. The resulting molded product had transparency but exhibited a lot of striae. The resulting molded product had refractive index (ne) of 1.57, an Abbe number (ve) of 41, a specific gravity of 1.18, and a Tg of 212° C. The results are shown in Table-1.

Comparative Example 9

55.7 parts by weight of 4,4'-methylene-bis(cyclohexyl isocyanate), 25.3 parts by weight of ethylene glycolbis(3-mercaptopropionate), 1.5 parts by weight of an ultraviolet absorber (manufactured by KYODO CHEMICAL CO., LTD.; trade name: Viosorb 583), 0.20 g of dimethyl tin dichloride, and 0.15 parts by weight of an internal mold release agent (manufactured by Mitsui Chemicals, Inc.; trade name: internal mold release agent for MR) were mixed and dissolved to prepare a homogeneous solution. Into this solution, 19.0 parts by weight of a mixture of 2,4-diamino-3,5-diethyl toluene and 2,6-diamino-3,5-diethyl toluene (manufactured by ALBEMARLE Corporation; trade name: ETHACURE 100) were charged, followed by stirring at high speed to make a homogeneous solution which was then injected into a molding mold. This was introduced into a polymerization oven, and the temperature was gradually increased to 25° C. to 130° C. over 24 hours to carry out polymerization. After the polymerization was completed, the molding mold was withdrawn from the oven, followed by demolding. The releasability was good, and peeling of the mold was not observed. The resulting molded product was further subjected to an annealing treatment at 130° C. for 2 hours. The resulting molded product had transparency but exhibited a lot of striae. The resulting molded product had a refractive index (ne) of 1.55, an Abbe number (ve) of 42, a specific gravity of 1.20, and a Tg of 182° C. The results are shown in Table-1.

Comparative Example 10

55.7 parts by weight of a mixture of 2,5-bis(isocyanatomethyl)bicyclo[2.2.1]heptane and 2,6-bis(isocyanatomethyl)bicyclo[2.2.1]heptane, and 1.5 parts by weight of an ultraviolet absorber (manufactured by KYODO CHEMICAL CO., LTD.; trade name: Viosorb 583) were mixed and dissolved to prepare a homogeneous solution. This solution was warmed to 50° C., and then 15.3 parts by weight of N,N'-di(1,2,2-trimethylpropyl)-1,6-hexamethylenediamine (manufactured by ALBEMARLE Corporation; trade name: ETHACURE 90) were added dropwise thereto, followed by reaction for 1 hour. Into this solution, 0.15 parts by weight of an internal mold release agent (manufactured by Mitsui Chemicals, Inc.; trade name: internal mold release agent for MR), 0.03 parts by weight of dimethyl tin dichloride, and 29.0 parts by weight of dipropylene glycol were mixed and dissolved to prepare a homogeneous solution. The solution was subjected to degassing at 400 Pa and then injected into a molding mold. This was introduced into a polymerization oven, and the temperature was gradually increased to 50° C. to 120° C. over 24 hours to carry out polymerization. After the polymerization was completed, the molding mold was withdrawn from the oven, followed by demolding. The releasability was good, and peeling of the mold was not observed. The resulting molded product was further subjected to an annealing treatment at 120° C. for 2 hours. The resulting molded product had transparency, a refractive index (ne) of 1.51, an Abbe number (ve) of 51, a specific gravity of 1.12, and a Tg of 85° C. The results are shown in Table-1.

Comparative Example 11

27.3 parts by weight of a mixture of 2,5-bis(isocyanatomethyl)bicyclo[2.2.1]heptane and 2,6-bis(isocyanatomethyl)bicyclo[2.2.1]heptane, and 1.5 parts by weight of an ultraviolet absorber (manufactured by KYODO CHEMICAL CO., LTD.; trade name: Viosorb 583) were mixed and dissolved to prepare a homogeneous solution. This solution was warmed to 50° C., and then 52.3 parts by weight of polypropylene glycol-based secondary amine (manufactured by HUNTSMAN INTERNATIONAL LLC.; trade name: JEFFAMINE SD-2001) were charged thereinto. The resulting urea prepolymer exhibited no transparency and also a very high viscosity, which resulted in difficulty of stirring. Therefore, it was incapable of carrying out subsequent works. The results are shown in Table-1.

Comparative Example 12

55.4 parts by weight of a mixture of 2,5-bis(isocyanatomethyl)bicyclo[2.2.1]heptane and 2,6-bis(isocyanatomethyl)bicyclo[2.2.1]heptane, and 1.5 parts by weight of an ultraviolet absorber (manufactured by KYODO CHEMICAL CO., LTD.; trade name: Viosorb 583) were mixed and dissolved to prepare a homogeneous solution. This solution was warmed to 50° C., and then 7.3 parts by weight of m-xylylenediamine were added dropwise thereto. Immediately after dropwise addition was completed, insoluble matter was produced along with rapid generation of heat. Therefore, subsequent works were discontinued. The results are shown in Table-1.

Comparative Example 13

45.1 parts by weight of a mixture of 2,5-bis(isocyanatomethyl)bicyclo[2.2.1]heptane and 2,6-bis(isocyanatomethyl)bicyclo[2.2.1]heptane, and 1.5 parts by weight of an ultraviolet absorber (manufactured by KYODO CHEMICAL CO., LTD.; trade name: Viosorb 583) were mixed and dissolved to prepare a homogeneous solution. This solution was warmed to 50° C., and then 43.5 parts by weight of N,N'-di(1,2,2-trimethylpropyl)-1,6-hexamethylenediamine (manufactured by ALBEMARLE Corporation; trade name: ETHACURE 90) were added dropwise thereto. After a few minutes, the viscosity of the resulting urea prepolymer was high, which resulted in difficulty of stirring. Consequently, there was no flowability observed even when it was heated to 90° C. Therefore, it was incapable of carrying out subsequent works. The results are shown in Table-1.

TABLE 1

| Examples | Amine | Isocyanate | Thiol or the like | *1 | Pot life - Mixing temperature (° C.) | Pot life - Time point exceeding 10,000 mPas | Optical properties - Transparency | Optical properties - Distortion (striae) | Optical properties - Refractive index (ne) | Optical properties - Abbe number (ve) | Specific gravity | Heat resistance Tg (° C.) | Impact resistance Steel ball weight at no breakage | Light resistance QUVΔYI |
|---|---|---|---|---|---|---|---|---|---|---|---|---|---|---|
| Example 1 | a-1 (12.5 parts by weight) | i-1 (51.6 parts by weight) | t-1 (35.9 parts by weight) | 0.17 | 50 | 3 h | ○ | ○ | 1.60 | 40 | 1.22 | 125 | >534 g | 2.2 |
| Example 2 | a-1 (12.4 parts by weight) | i-1 (45.0 parts by weight) | t-2 (42.6 parts by weight) | 0.20 | 50 | 3 h | ○ | ○ | 1.55 | 43 | 1.23 | 121 | >534 g | 1.1 |
| Example 3 | a-1 (13.1 parts by weight) | i-1 (50.5 parts by weight) | t-3 (36.4 parts by weight) | 0.19 | 50 | 3 h | ○ | ○ | 1.60 | 40 | 1.22 | 130 | >534 g | 2.0 |
| Example 4 | a-2 (15.8 parts by weight) | i-1 (50.3 parts by weight) | t-1 (33.9 parts by weight) | 0.20 | 50 | 2 h | ○ | ○ | 1.60 | 41 | 1.22 | 134 | >534 g | 1.8 |
| Example 5 | a-3 (12.8 parts by weight) | i-1 (52.1 parts by weight) | t-1 (35.1 parts by weight) | 0.20 | 50 | 2 h | ○ | ○ | 1.60 | 40 | 1.23 | 132 | 225 g | 2.0 |
| Example 6 | a-1 (13.4 parts by weight) | i-2 (20.6 parts by weight) i-3 (33.2 parts by weight) | t-1 (32.8 parts by weight) | 0.20 | 50 | 2 h | ○ | ○ | 1.60 | 38 | 1.20 | 114 | >534 g | 1.6 |
| Example 7 | a-1 (6.3 parts by weight) | i-3 (58.7 parts by weight) | t-1 (35.0 parts by weight) | 0.10 | 50 | 3 h | ○ | ○ | 1.59 | 41 | 1.15 | 125 | 225 g | 1.4 |
| Example 8 | a-1 (12.4 parts by weight) | i-3 (57.3 parts by weight) | t-1 (30.3 parts by weight) | 0.20 | 50 | 3 h | ○ | ○ | 1.57 | 41 | 1.16 | 126 | >534 g | 1.6 |
| Example 9 | a-3 (11.3 parts by weight) | i-3 (58.0 parts by weight) | t-1 (30.7 parts by weight) | 0.20 | 50 | 3 h | ○ | ○ | 1.58 | 41 | 1.17 | 140 | >534 g | 1.4 |
| Example 10 | a-1 (12.8 parts by weight) | i-4 (50.1 parts by weight) | t-1 (37.1 parts by weight) | 0.17 | 50 | 3 h | ○ | ○ | 1.60 | 40 | 1.22 | 122 | >534 g | 1.8 |
| Example 11 | a-1 (12.8 parts by weight) | i-5 (50.1 parts by weight) | t-1 (37.1 parts by weight) | 0.17 | 50 | 3 h | ○ | ○ | 1.60 | 40 | 1.22 | 121 | >534 g | 1.9 |
| Example 12 | a-1 (22.8 parts by weight) | i-6 (44.8 parts by weight) | t-1 (32.4 parts by weight) | 0.30 | 20 | >5 h | ○ | ○ | 1.57 | 40 | 1.17 | 83 | >534 g | 2.8 |
| Example 13 | a-3 (20.8 parts by weight) | i-6 (45.9 parts by weight) | t-1 (33.2 parts by weight) | 0.30 | 20 | >5 h | ○ | ○ | 1.58 | 40 | 1.19 | 87 | >534 g | 1.7 |
| Example 14 | a-3 (32.6 parts by weight) | i-1 (10.6 parts by weight) i-6 (34.5 parts by weight) | t-1 (22.3 parts by weight) | 0.50 | 20 | 2 h | ○ | ○ | 1.56 | 41 | 1.16 | 95 | 225 g | 4.8 |
| Example 15 | a-1 (13.1 parts by weight) | i-6 (45.6 parts by weight) | t-3 (41.3 parts by weight) | 0.17 | 20 | >5 h | ○ | ○ | 1.60 | 39 | 1.22 | 87 | >534 g | 2.5 |
| Example 16 | a-2 (15.4 parts by weight) | i-6 (44.7 parts by weight) | t-3 (39.9 parts by weight) | 0.18 | 20 | >5 h | ○ | ○ | 1.60 | 39 | 1.23 | 92 | >534 g | 2.0 |
| Example 17 | a-3 (13.2 parts by weight) | i-6 (46.1 parts by weight) | t-3 (40.7 parts by weight) | 0.19 | 20 | >5 h | ○ | ○ | 1.60 | 39 | 1.23 | 91 | >534 g | 1.4 |
| Example 18 | a-4 (9.9 parts by weight) | i-6 (48.1 parts by weight) | t-3 (42.0 parts by weight) | 0.20 | 20 | >5 h | ○ | ○ | 1.60 | 38 | 1.23 | 82 | 225 g | 4.2 |
| Example 19 | a-4 (9.6 parts by weight) | i-1 (28.6 parts by weight) i-6 (23.3 parts by weight) | t-1 (38.5 parts by weight) | 0.20 | 20 | >5 h | ○ | ○ | 1.60 | 39 | 1.24 | 99 | >534 g | 2.9 |

TABLE 1-continued

| Examples | Amine | Isocyanate | Thiol or the like | *1 | Pot life Mixing temperature (° C.) | Pot life Time point exceeding 10,000 mPas | Transparency | Distortion (striae) | Refractive index (ne) | Abbe number (ve) | Specific gravity | Heat resistance Tg (° C.) | Impact resistance Steel ball weight at no breakage | Light resistance QUVΔYI |
|---|---|---|---|---|---|---|---|---|---|---|---|---|---|---|
| Example 20 | a-4 (8.9 parts by weight) | i-3 (33.8 parts by weight) i-6 (21.6 parts by weight) | t-1 (35.7 parts by weight) | 0.20 | 20 | >5 h | ○ | ○ | 1.59 | 40 | 1.21 | 105 | >534 g | 2.5 |
| Comparative Example 1 | — | i-1 (54.3 parts by weight) | t-1 (45.7 parts by weight) | — | — | — | ○ | ○ | 1.62 | 37 | 1.30 | 115 | 112 g | — |
| Comparative Example 2 | — | i-1 (52.9 parts by weight) | t-3 (47.1 parts by weight) | — | — | — | ○ | ○ | 1.63 | 37 | 1.31 | 125 | 112 g | — |
| Comparative Example 3 | — | i-6 (49.2 parts by weight) | t-1 (50.8 parts by weight) | — | — | — | ○ | ○ | 1.62 | 38 | 1.29 | 58 | — | — |
| Comparative Example 4 | — | i-6 (47.8 parts by weight) | t-3 (52.2 parts by weight) | — | — | — | ○ | ○ | 1.63 | 40 | 1.30 | 70 | — | — |
| Comparative Example 5 | a-5 (7.3 parts by weight) | i-3 (60.1 parts by weight) | t-1 (32.6 parts by weight) | 0.20 | 20 | 4 min | × | × | The resulting resin exhibited while turbidity, so subsequent evaluation was discontinued. | | | | | |
| Comparative Example 6 | a-5 (20.3 parts by weight) | i-3 (59.9 parts by weight) | t-1 (19.8 parts by weight) | 0.50 | 20 | 1 min | ○ | × | 1.57 | 40 | 1.20 | 220 | 112 g | 18.3 |
| Comparative Example 7 | a-5 (20.1 parts by weight) | i-3 (59.2 parts by weight) | t-3 (20.7 parts by weight) | 0.50 | 20 | 1 min | ○ | × | 1.57 | 40 | 1.20 | 263 | 112 g | 17.5 |
| Comparative Example 8 | a-5 (20.8 parts by weight) | i-3 (61.2 parts by weight) | t-4 (18.0 parts by weight) | 0.50 | 20 | 1 min | ○ | × | 1.57 | 41 | 1.18 | 212 | <8 g | 9.8 |
| Comparative Example 9 | a-5 (19.0 parts by weight) | i-3 (55.7 parts by weight) | t-5 (25.3 parts by weight) | 0.50 | 20 | — | ○ | × | 1.55 | 42 | 1.20 | 182 | <8 g | 10.5 |
| Comparative Example 10 | a-1 (15.3 parts by weight) | i-1 (55.7 parts by weight) | t-6 (29.0 parts by weight) | 0.20 | — | — | ○ | ○ | 1.51 | 51 | 1.12 | 85 | <8 g | — |
| Comparative Example 11 | a-6 (52.3 parts by weight) | i-1 (27.3 parts by weight) | — | 0.20 | The resulting urea pre polymer was highly viscous, so subsequent works could not be conducted. | | | | | | | | | |
| Comparative Example 12 | a-7 (7.3 parts by weight) | i-1 (55.4 parts by weight) | — | 0.20 | The resulting urea pre polymer exhibited generation of insoluble matter, so subsequent works were discontinued. | | | | | | | | | |
| Comparative Example 13 | a-1 (43.5 parts by weight) | i-1 (45.1 parts by weight) | — | 0.70 | The resulting urea pre polymer was highly viscous, so subsequent works could not be conducted. | | | | | | | | | |

*1: The ratio (a/b) of the molar number a of amino groups in the amine (A) with respect to the molar number b of isocyanato groups in the isocyanate (B)

i-1: A mixture of 2,5-bis(isocyanatomethyl)-bicyclo[2.2.1]heptanes and 2,6-bis(isocyanatomethyl)-bicyclo[2.2.1]heptane i-2: m-Xylylene diisocyanate
i-3: 4,4'-Methylene-bis(cyclohexyl isocyanate)
i-4: 1,3-Bis(isocyanatomethyl)cyclohexane
i-5: 1,4-Bis(isocyanatomethyl)cyclohexane
i-6: 1,6-Hexamethylene diisocyanate
t-1: 4-Mercaptomethyl-1,8-dimercapto-3,6-dithiaoctane
t-2: Pentaerythritol tetrakis(3-mercaptopropionate)
t-3: A mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane
t-4: Bis(2-mercaptoethyl)sulfide
t-5: Ethylene glycolbis(3-mercaptopropionate)
t-6: Dipropylene glycol
a-1: N,N'-Di(1,2,2-trimethylpropyl)-1,6-hexamethylenediamine (manufactured by ALBEMARLE Corporation; trade name: ETHACURE 90; molecular weight: 284.5)
a-2: N,N'-Di-sec-butyl-4,4'-methylene-bis(cyclohexylamine) (manufactured by Dorf Ketal Specialty Catalysts, LLC.; trade name: CLEARLINK 1000; molecular weight: 322.6)
a-3: N,N'-Di-isopropyl-isophorone diamine (manufactured by HUNTSMAN INTERNATIONAL LLC.; trade name: JEFFLINK 754; molecular weight: 254.5)
a-4: N,N'-Di-tert-butyl-ethylenediamine (manufactured by Tokyo Chemical Industry Co., Ltd.; product code: D2638; molecular weight: 172.3)
a-5: A mixture of 2,4-diamino-3,5-diethyl toluene and 2,6-diamino-3,5-diethyl toluene (manufactured by ALBEMARLE Corporation; trade name: ETHACURE 100; molecular weight: 178.3)
a-6: Polypropylene glycol-based secondary amine (manufactured by HUNTSMAN INTERNATIONAL LLC.; trade name: JEFFAMINE SD-2001; average molecular weight: 2050)
a-7: m-Xylylenediamine When compared with Comparative Examples 1 to 4 which correspond to a thiourethane molded product, the thiourethane urea molded product of the present invention exhibited a low specific gravity, an excellent impact resistance and an excellent light resistance, and excellent balance of these properties (Examples 4 and 5 and Comparative Example 1, or Example 3 and Comparative Example 2, or Examples 12 and 13 and Comparative Example 3, or Examples 15 to 17 and Comparative Example 4).

Further, when compared with Comparative Examples 5 to 9 which correspond to a thiourethane urea molded product using a primary aromatic amine, the thiourethane urea molded product of the present invention exhibited low white turbidity, excellent transparency, little striae due to a long pot life and an excellent light resistance, and excellent balance of these properties.

Further, when compared with the thiourethane urea molded product using a bifunctional thiol (Comparative Examples 8 and 9) or the urethane urea molded product using a bifunctional alcohol (Comparative Example 10), the thiourethane urea molded product of the present invention exhibited a significantly superior impact resistance.

As described above, according to the polymerizable composition for an optical material of the present invention, it was demonstrated that it is possible to obtain a high-refractive index thiourethane urea molded product having a low specific gravity, an excellent heat resistance, an excellent impact resistance and an excellent light resistance, and also exhibiting suppressed occurrence of optical distortion (striae) due to a long pot life of the polymerizable composition.

A thiourethane urea molded product obtained from the polymerizable composition for an optical material according to the present invention can be suitably used in a variety of optical materials where high transparency is required, in particular, eyeglass lenses.

This application claims priority based on Japanese Patent Application No. 2014-140776, filed on Jul. 8, 2014, the disclosure of which is incorporated herein in its entirety.

The invention claimed is:

1. A polymerizable composition for an optical material, comprising:
a prepolymer obtained by reacting (A) an amine having two or more secondary amino groups and (B) an isocyanate having two or more isocyanato groups; and (C) a thiol having three or more mercapto groups,
wherein the ratio (a/b) of the molar number a of amino groups in the amine (A) with respect to the molar number b of isocyanato groups in the isocyanate (B) is in the range of 0.10 to 0.60.

2. The polymerizable composition for an optical material according to claim 1, wherein the amine (A) is comprised of one or more compounds selected from a secondary aliphatic amine and a secondary alicyclic amine.

3. The polymerizable composition for an optical material according to claim 1, wherein the amine (A) has two or more secondary amino groups represented by the formula: —NHR, and two or more R's may be the same or different from each other and are selected from an isopropyl group, a 1,2,2-trimethylpropyl group, a tert-butyl group, a sec-butyl group, and a 1,3-dimethylbutyl group.

4. The polymerizable composition for an optical material according to claim 1, wherein the molecular weight of the amine (A) is 600 or less.

5. The polymerizable composition for an optical material according to claim 1, wherein the amine (A) is comprised of one or more compounds selected from N,N'-di-tert-butyl-ethylenediamine, N,N'-di(1,2,2-trimethylpropyl)-1,6-hexamethylenediamine, N,N'-di-isopropyl-m-xylylenediamine, N,N'-di-sec-butyl-m-xylylenediamine, N,N'-(cyclohexyl-1,3-diylbis(methylene))bis(isopropyl-2-amine), N,N'-(cyclohexyl-1,3-diylbis(methylene))bis(sec-propyl-2-amine), N,N'-(cyclohexyl-1,4-diylbis(methylene))bis(isopropyl-2-amine), N,N'-(cyclohexyl-1,4-diylbis(methylene))bis(sec-propyl-2-amine), N,N'-di-isopropyl-isophorone diamine, N,N'-di-sec-butyl-4,4'-methylene-bis(cyclohexylamine), N,N'-di-sec-butyl-4,4'-methylene-bis(2-methylcyclohexylamine), N,N'-di-isopropyl-2,5-diaminomethyl-bicyclo[2.2.1]heptane, N,N'-di-sec-butyl-2,5-diaminomethyl-bicyclo[2.2.1]heptane, N,N'-di-isopropyl-2,6-diaminomethyl-bicyclo[2.2.1]heptane, and N,N'-di-sec-butyl-2,6-diaminomethyl-bicyclo[2.2.1]heptane.

6. The polymerizable composition for an optical material according to claim 1, wherein the isocyanate (B) is comprised of one or more compounds selected from m-xylylene diisocyanate, 2,5-bis(isocyanatomethyl)bicyclo[2.2.1]heptane, 2,6-bis(isocyanatomethyl)bicyclo[2.2.1]heptane, 1,3-bis(isocyanatomethyl)cyclohexane, 1,4-bis(isocyanatomethyl)cyclohexane, isophorone diisocyanate, 4,4'-methylene-bis(cyclohexyl isocyanate), 1,5-pentane diisocyanate, 1,6-hexamethylene diisocyanate, 2,4-tolylene diisocyanate, and 2,6-tolylene diisocyanate.

7. The polymerizable composition for an optical material according to claim 1, wherein the thiol (C) is comprised of one or more compounds selected from 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 4-mercaptomethyl-1,8-dimercapto-3,6-dithiaoctane, 1,1,3,3-tetrakis(mercaptomethylthio)propane, trimethyloipropane tris(3-mercaptopropionate), pentaerythritol tetrakis(2-mercaptoacetate), and pentaerythritol tetrakis(3-mercaptopropionate).

8. A molded product obtained by polymerizing the polymerizable composition for an optical material according to claim 1.

9. An optical material comprised of the molded product according to claim 8.

10. A plastic lens made of the molded product according to claim 8.

11. A method for producing a polymerizable composition for an optical material, comprising:
   a step (i) of reacting an amine (A) and an isocyanate (B) to obtain a prepolymer; and
   a step (ii) of adding and mixing a thiol (C) into the prepolymer,
   wherein the ratio (a/b) of the molar number a of amino groups in the amine (A) with respect to the molar number b of isocyanato groups in the isocyanate (B) is in the range of 0.10 to 0.60.

12. The method for producing a polymerizable composition for an optical material according to claim 11, wherein the amine (A) is one or more compounds selected from a secondary aliphatic amine and a secondary alicyclic amine.

13. The method for producing a polymerizable composition for an optical material according to claim 11, wherein the amine (A) is comprised of a compound having two or more secondary amino groups represented by the formula: —NHR, and two or more R's may be the same or different from each other and are selected from an isopropyl group, a 1,2,2-trimethylpropyl group, a tert-butyl group, a sec-butyl group, and a 1,3-dimethylbutyl group.

14. The method for producing a polymerizable composition for an optical material according to claim 11, wherein the molecular weight of the amine (A) is 600 or less.

15. The method for producing a polymerizable composition for an optical material according to claim 11, wherein the amine (A) is comprised of one or more compounds selected from N,N'-di-tert-butyl-ethylenediamine, N,N'-di(1,2,2-trimethylpropyl)-1,6-hexamethylenediamine, N,N'-di-isopropyl-m-xylylenediamine, N,N'-di-sec-butyl-m-xylylenediamine, N,N'-(cyclohexyl-1,3-diylbis(methylene))bis(isopropyl-2-amine), N,N'-(cyclohexyl-1,3-diylbis(methylene))bis(sec-propyl-2-amine), N,N'-(cyclohexyl-1,4-diylbis(methylene))bis(isopropyl-2-amine), N,N'-(cyclohexyl-1,4-diylbis(methylene))bis(sec-propyl-2-amine), N,N'-di-isopropyl-isophorone diamine, N,N'-di-sec-butyl-4,4'-methylene-bis(cyclohexylamine), N,N'-di-sec-butyl-4,4'-methylene-bis(2-methylcyclohexylamine), N,N'-di-isopropyl-2,5-diaminomethyl-bicyclo[2.2.1]heptane, N,N'-di-sec-butyl-2,5-diaminomethyl-bicyclo[2.2.1]heptane, N,N'-di-isopropyl-2,6-diaminomethyl-bicyclo[2.2.1]heptane, and N,N'-di-sec-butyl-2,6-diaminomethyl-bicyclo[2.2.1]heptane.

\* \* \* \* \*